United States Patent
Wang

(10) Patent No.: US 10,009,859 B2
(45) Date of Patent: Jun. 26, 2018

(54) TRANSMIT POWER CONTROL METHOD AND DEVICE IN D2D COMMUNICATION

(71) Applicant: Huawei Technologies Co., Ltd., Shenzhen, Guangdong (CN)

(72) Inventor: Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

(21) Appl. No.: 14/901,845

(22) PCT Filed: May 30, 2014

(86) PCT No.: PCT/CN2014/078998
§ 371 (c)(1),
(2) Date: Dec. 29, 2015

(87) PCT Pub. No.: WO2015/180170
PCT Pub. Date: Dec. 3, 2015

(65) Prior Publication Data
US 2017/0086150 A1    Mar. 23, 2017

(51) Int. Cl.
*H04W 52/38* (2009.01)
*H04W 52/00* (2009.01)
(Continued)

(52) U.S. Cl.
CPC ........ *H04W 52/383* (2013.01); *H04W 8/005* (2013.01); *H04W 52/00* (2013.01);
(Continued)

(58) Field of Classification Search
None
See application file for complete search history.

(56) References Cited

U.S. PATENT DOCUMENTS 9,585,106 B2 * 2/2017 Yang ................. H04W 52/265
2009/0010185 A1    1/2009 Li et al.
(Continued)

FOREIGN PATENT DOCUMENTS

CN    102083138 A    6/2011
CN    102123496 A    7/2011
(Continued)

OTHER PUBLICATIONS

Gabor Fodor et al., "A Comparative Study of Power Control Approaches for Device-to-Device Communications", IEEE ICC 2013—Wireless Networking Symposium, p. 6008-6013.
(Continued)

*Primary Examiner* — Saba Tsegaye

(57) ABSTRACT

In the present invention, a network device determines and delivers control information, where the control information includes first subframe information and a first power control manner in which power control is performed in a first subframe corresponding to the first subframe information, and second subframe information and a second power control manner in which power control is performed in a second subframe corresponding to the second subframe information. A user equipment in D2D communication acquires the control information delivered by the network device; transmits, by using the transmit power determined according to the first power control manner, a D2D signal in the first subframe corresponding to the first subframe information; and transmits, by using the transmit power determined according to the second power control manner, a D2D signal in the second subframe corresponding to the second subframe information.

16 Claims, 11 Drawing Sheets

(51) Int. Cl.
*H04W 8/00* (2009.01)
*H04W 52/24* (2009.01)
*H04W 72/04* (2009.01)
*H04W 52/10* (2009.01)
*H04W 88/02* (2009.01)

(52) U.S. Cl.
CPC ..... *H04W 52/242* (2013.01); *H04W 72/0406* (2013.01); *H04W 72/0473* (2013.01); *H04W 52/10* (2013.01); *H04W 88/02* (2013.01)

(56) References Cited

U.S. PATENT DOCUMENTS

| | | | | |
|---|---|---|---|---|
| 2010/0285830 | A1* | 11/2010 | Englund | H04W 52/146 455/522 |
| 2013/0273924 | A1* | 10/2013 | Hakola | H04W 72/0413 455/450 |
| 2013/0310103 | A1 | 11/2013 | Madan et al. | |
| 2013/0324182 | A1 | 12/2013 | Deng et al. | |
| 2014/0198694 | A1* | 7/2014 | Yang | H04W 52/242 370/311 |
| 2014/0274196 | A1 | 9/2014 | Dai et al. | |
| 2014/0307660 | A1 | 10/2014 | Gong et al. | |
| 2014/0328200 | A1 | 11/2014 | Palanki et al. | |
| 2014/0378150 | A1 | 12/2014 | Li et al. | |
| 2015/0173029 | A1 | 6/2015 | Fujishiro | |
| 2015/0200756 | A1* | 7/2015 | Lee | H04L 5/0048 370/329 |
| 2015/0237616 | A1 | 8/2015 | Morita | |
| 2015/0327188 | A1* | 11/2015 | Bagheri | H04W 52/383 455/426.1 |
| 2016/0278131 | A1 | 9/2016 | Yamazaki et al. | |
| 2017/0041884 | A1* | 2/2017 | Kwak | H04W 52/367 |

FOREIGN PATENT DOCUMENTS

| | | |
|---|---|---|
| CN | 102404837 A | 4/2012 |
| CN | 103096448 A | 5/2013 |
| CN | 103139889 A | 6/2013 |
| CN | 103139921 A | 6/2013 |
| CN | 103814609 A | 5/2014 |
| EP | 2770785 B1 | 6/2016 |
| JP | 2008510344 A | 4/2008 |
| JP | 2011520355 A | 7/2011 |
| JP | 2013500631 A | 1/2013 |
| JP | 2015517778 | 6/2015 |
| WO | 2013177177 A1 | 11/2013 |
| WO | 2013183731 A1 | 12/2013 |
| WO | 2014034573 A1 | 3/2014 |
| WO | 2014050556 A1 | 4/2014 |

OTHER PUBLICATIONS

"WF on D2D Power Control", Qualcomm Incorporated et al., 3GPP TSG RAN WG1 #77, May 19-23, 2014, 3 pages, R1-142623.

NSN et al.; "WAN protection by configurable D2D transmission power control"; 3GPP TSG-RAN WG1 Meeting #77; R1-142454; Seoul, Korea; May 19-23, 2014; 3 pages.

* cited by examiner

TRANSMIT POWER CONTROL METHOD AND DEVICE IN D2D COMMUNICATION

CROSS REFERENCE TO RELATED APPLICATIONS

The present application claims priority under 35 U.S.C. § 365 to International Patent Application No. PCT/CN2014/078998 filed May 30, 2014 and which is incorporated herein by reference into the present disclosure as if fully set forth herein.

TECHNICAL FIELD

The present invention relates to the field of wireless communications technologies, and in particular, to a transmit power control method and a device in D2D communication.

BACKGROUND

A device to device proximity service (Device to Device Proximity Service, D2D ProSe) has become a main topic of study in a 3rd Generation Partnership Project (3rd Generation partnership project, 3GPP) Long Term Evolution (Long Term Evolution, LTE) system.

A communication process of implementing the D2D ProSe service may be referred to as device to device (Device to Device, D2D) communication for short. Currently, when transmitting a D2D signal, a user equipment in D2D communication uses single maximum power for transmission. For example, a user equipment in D2D communication supports transmit power of 23 dBm, and then when transmitting a D2D signal, the user equipment uses the transmit power of 23 dBm for transmission.

In a practical communication process, as shown in FIG. 1A and FIG. 1B, a D2D signal transmitted by a user equipment in D2D communication and an uplink signal transmitted by a user equipment in uplink communication may be multiplexed together in a manner of frequency division multiplexing. FIG. 1A and FIG. 1B are a schematic diagram of a bandwidth of 10 MHz (50 physical resource block pairs (physical resource block pair, PRB Pair)) in a time length of one millisecond. As shown in FIG. 1A and FIG. 1B, in the bandwidth of 10 MHz, there are altogether 50 PRBs, where the first PRB to the $N^{th}$ PRB and the $M^{th}$ PRB to the fiftieth PRB are used for transmitting an uplink signal, and the $N+1^{th}$ PRB to the $M-1^{th}$ PRB are used for transmitting a D2D signal.

It can be learned from FIG. 1A and FIG. 1B that, when a D2D signal is transmitted, a subframe format with an extended cyclic prefix (Extended Cyclic Prefix, Extended CP) is used, that is, within a time period of 1 ms, 12 orthogonal frequency division multiplexing (Orthogonal Frequency Division Multiplexing, OFDM) symbols are transmitted; and when an uplink signal is transmitted, a subframe format with a normal cyclic prefix (Normal Cyclic Prefix, Normal CP) is used, that is, within a time period of 1 ms, 14 OFDM symbols are transmitted. The subframe format for transmitting a D2D signal is different from the subframe format for transmitting an uplink signal, and therefore carrier interference exists between the D2D signal and the uplink signal. As shown in FIG. 1A and FIG. 1B, it is assumed that a user equipment 1 is transmitting a D2D signal on PRB#N+1 by using maximum power, and at the same time, a user equipment 2 transmits an uplink signal by using PRB#N. The D2D signal transmitted by the user equipment 1 and the uplink signal transmitted by the user equipment 2 are not aligned in terms of time (the 14 symbols and the 12 symbols cannot be aligned), causing that when receiving the uplink signal transmitted by the user equipment 2 on PRB#N, a network device also receives a leakage signal of the D2D signal transmitted by the user equipment 1, which causes inter-carrier interference. The user equipment 1 uses the maximum power to transmit the D2D signal, and therefore the inter-carrier interference may be very strong, causing accuracy of receiving the uplink signal of the user equipment 2 to reduce.

SUMMARY

Embodiments of the present invention provide a transmit power control method and a device in D2D communication, so as to improve accuracy of receiving an uplink signal by a network device.

According to a first aspect, a transmit power control method in device to device D2D communication is provided, including:

determining control information, where the control information includes first subframe information and a first power control manner in which power control is performed in a first subframe corresponding to the first subframe information, and second subframe information and a second power control manner in which power control is performed in a second subframe corresponding to the second subframe information; and delivering the control information, so that a user equipment in D2D communication transmits, by using transmit power determined according to the first power control manner, a D2D signal in the first subframe corresponding to the first subframe information, and transmits, by using transmit power determined according to the second power control manner, a D2D signal in the second subframe corresponding to the second subframe information.

With reference to the first aspect, in a first implementation manner, the determining control information includes:

determining the first subframe information and first power control parameters for performing power control in the first subframe corresponding to the first subframe information, and the second subframe information and second power control parameters for performing power control in the second subframe corresponding to the second subframe information, where values of the first power control parameters are different from values of the second power control parameters; and the delivering the control information, so that a user equipment in D2D communication transmits, by using transmit power determined according to the first power control manner, a D2D signal in the first subframe corresponding to the first subframe information, and transmits, by using transmit power determined according to the second power control manner, a D2D signal in the second subframe corresponding to the second subframe information includes:

delivering the first subframe information, the first power control parameters, the second subframe information, and the second power control parameters, so that the user equipment in D2D communication transmits, by using the transmit power determined according to the first power control parameters, a D2D signal in the first subframe corresponding to the first subframe information, and transmits, by using the transmit power determined according to the second power control parameters, a D2D signal in the second subframe corresponding to the second subframe information.

With reference to the first aspect, in a second implementation manner, the determining control information includes:

determining the first subframe information and first power control parameters for performing power control in the first subframe corresponding to the first subframe information, and the second subframe information and instruction information that instructs to transmit a D2D signal in the second subframe by using maximum transmit power supported by the user equipment in D2D communication; and the delivering the control information, so that a user equipment in D2D communication transmits, by using transmit power determined according to the first power control manner, a D2D signal in the first subframe corresponding to the first subframe information, and transmits, by using transmit power determined according to the second power control manner, a D2D signal in the second subframe corresponding to the second subframe information includes:

delivering the first subframe information, the first power control parameters, the second subframe information, and the instruction information, so that the user equipment in D2D communication transmits, by using the transmit power determined according to the first power control parameters, a D2D signal in the first subframe corresponding to the first subframe information, and transmits, by using the maximum transmit power supported by the user equipment in D2D communication, a D2D signal in the second subframe corresponding to the second subframe information.

With reference to the first implementation manner of the first aspect or the second implementation manner of the first aspect, the power control parameter includes:

a path loss compensation factor and target receive power at which a network device receives an uplink signal; or a path loss compensation factor, a power offset, and target receive power at which a network device receives an uplink signal.

According to a second aspect, a transmit power control method in device to device D2D communication is provided, including:

acquiring control information delivered by a network device, where the control information includes first subframe information and a first power control manner in which power control is performed in a first subframe corresponding to the first subframe information, and second subframe information and a second power control manner in which power control is performed in a second subframe corresponding to the second subframe information; and transmitting, according to the control information by using transmit power determined according to the first power control manner, a D2D signal in the first subframe corresponding to the first subframe information, and transmitting, according to the control information by using transmit power determined according to the second power control manner, a D2D signal in the second subframe corresponding to the second subframe information.

With reference to the second aspect, in a first implementation manner, the acquiring control information delivered by a network device includes:

acquiring the first subframe information and first power control parameters for performing power control in the first subframe corresponding to the first subframe information, and the second subframe information and second power control parameters for performing power control in the second subframe corresponding to the second subframe information, where the first subframe information and the first power control parameters are delivered by the network device, and values of the first power control parameters are different from values of the second power control parameters; and the transmitting, according to the control information by using transmit power determined according to the first power control manner, a D2D signal in the first subframe corresponding to the first subframe information, and transmitting, according to the control information by using transmit power determined according to the second power control manner, a D2D signal in the second subframe corresponding to the second subframe information includes:

transmitting, according to the first subframe information and the first power control parameters by using the transmit power determined according to the first power control parameters, a D2D signal in the first subframe corresponding to the first subframe information; and transmitting, according to the second subframe information and the second power control parameters by using the transmit power determined according to the second power control parameters, a D2D signal in the second subframe corresponding to the second subframe information.

With reference to the second aspect, in a second implementation manner, the acquiring control information delivered by a network device includes:

acquiring the first subframe information and first power control parameters for performing power control in the first subframe corresponding to the first subframe information, and the second subframe information and instruction information that instructs to transmit a D2D signal in the second subframe corresponding to the second subframe information by using maximum transmit power supported by a user equipment in D2D communication, where the first subframe information and the first power control parameters are delivered by the network device; and the transmitting, according to the control information by using transmit power determined according to the first power control manner, a D2D signal in the first subframe corresponding to the first subframe information, and transmitting, according to the control information by using transmit power determined according to the second power control manner, a D2D signal in the second subframe corresponding to the second subframe information includes:

transmitting, according to the first subframe information and the first power control parameters by using the transmit power determined according to the first power control parameters, a D2D signal in the first subframe corresponding to the first subframe information; and transmitting, according to the second subframe information and the instruction information by using the maximum transmit power supported by the user equipment in D2D communication, a D2D signal in the second subframe corresponding to the second subframe information.

With reference to the first implementation manner of the second aspect or the second implementation manner of the second aspect, in a third implementation manner, determining transmit power according to power control parameters includes:

determining, according to a path loss estimate, target receive power that is delivered by the network device and at which the network device receives an uplink signal, and a path loss compensation factor delivered by the network device, the transmit power for transmitting a D2D signal; or determining, according to a path loss estimate, target receive power that is delivered by the network device and at which the network device receives an uplink signal, a path loss compensation factor delivered by the network device, and a power offset delivered by the network device, the transmit power for transmitting a D2D signal.

According to a third aspect, a network device is provided, where the network device includes a determining unit and a delivering unit, where:

the determining unit is configured to determine control information, where the control information includes first subframe information and a first power control manner in which power control is performed in a first subframe corresponding to the first subframe information, and second subframe information and a second power control manner in which power control is performed in a second subframe corresponding to the second subframe information; and the delivering unit is configured to deliver the control information determined by the determining unit, so that a user equipment in D2D communication transmits, by using transmit power determined according to the first power control manner, a D2D signal in the first subframe corresponding to the first subframe information, and transmits, by using transmit power determined according to the second power control manner, a D2D signal in the second subframe corresponding to the second subframe information.

With reference to the third aspect, in a first implementation manner, the determining unit is specifically configured to determine the control information in the following manner:

determining the first subframe information and first power control parameters for performing power control in the first subframe corresponding to the first subframe information, and the second subframe information and second power control parameters for performing power control in the second subframe corresponding to the second subframe information, where values of the first power control parameters are different from values of the second power control parameters; and the delivering unit is specifically configured to deliver the control information in the following manner, so that the user equipment in D2D communication transmits, by using the transmit power determined according to the first power control manner, a D2D signal in the first subframe corresponding to the first subframe information, and transmits, by using the transmit power determined according to the second power control manner, a D2D signal in the second subframe corresponding to the second subframe information:

delivering the first subframe information, the first power control parameters, the second subframe information, and the second power control parameters, so that the user equipment in D2D communication transmits, by using the transmit power determined according to the first power control parameters, a D2D signal in the first subframe corresponding to the first subframe information, and transmits, by using the transmit power determined according to the second power control parameters, a D2D signal in the second subframe corresponding to the second subframe information.

With reference to the third aspect, in a second implementation manner, the determining unit is specifically configured to determine the control information in the following manner:

determining the first subframe information and first power control parameters for performing power control in the first subframe corresponding to the first subframe information, and the second subframe information and instruction information that instructs to transmit a D2D signal in the second subframe by using maximum transmit power supported by the user equipment in D2D communication; and the delivering unit is specifically configured to deliver the control information in the following manner, so that the user equipment in D2D communication transmits, by using the transmit power determined according to the first power control manner, a D2D signal in the first subframe corresponding to the first subframe information, and transmits, by using the transmit power determined according to the second power control manner, a D2D signal in the second subframe corresponding to the second subframe information:

delivering the first subframe information, the first power control parameters, the second subframe information, and the instruction information, so that the user equipment in D2D communication transmits, by using the transmit power determined according to the first power control parameters, a D2D signal in the first subframe corresponding to the first subframe information, and transmits, by using the maximum transmit power supported by the user equipment in D2D communication, a D2D signal in the second subframe corresponding to the second subframe information.

With reference to the first implementation manner of the third aspect or the second implementation manner of the third aspect, in a third implementation manner, the power control parameter determined by the determining unit includes:

a path loss compensation factor and target receive power at which the network device receives an uplink signal; or a path loss compensation factor, a power offset, and target receive power at which the network device receives an uplink signal.

According to a fourth aspect, a user equipment is provided, where the user equipment includes an acquiring unit and a transmitting unit, where:

the acquiring unit is configured to acquire control information delivered by a network device, where the control information includes first subframe information and a first power control manner in which power control is performed in a first subframe corresponding to the first subframe information, and second subframe information and a second power control manner in which power control is performed in a second subframe corresponding to the second subframe information; and the transmitting unit is configured to: according to the control information acquired by the acquiring unit, transmit, by using transmit power determined according to the first power control manner, a D2D signal in the first subframe corresponding to the first subframe information, and transmit, by using transmit power determined according to the second power control manner, a D2D signal in the second subframe corresponding to the second subframe information.

With reference to the fourth aspect, in a first implementation manner, the acquiring unit is specifically configured to acquire the control information delivered by the network device, in the following manner:

acquiring the first subframe information and first power control parameters for performing power control in the first subframe corresponding to the first subframe information, and the second subframe information and second power control parameters for performing power control in the second subframe corresponding to the second subframe information, where the first subframe information and the first power control parameters are delivered by the network device, and values of the first power control parameters are different from values of the second power control parameters; and the transmitting unit is specifically configured to: transmit, according to the control information by using the transmit power determined according to the first power control manner, a D2D signal in the first subframe corresponding to the first subframe information, and transmit, according to the control information by using the transmit power determined according to the second power control manner, a D2D signal in the second subframe corresponding to the second subframe information, in the following manner:

transmitting, according to the first subframe information and the first power control parameters by using the transmit power determined according to the first power control parameters, a D2D signal in the first subframe corresponding to the first subframe information; and transmitting, according to the second subframe information and the second power control parameters by using the transmit power determined according to the second power control parameters, a D2D signal in the second subframe corresponding to the second subframe information.

With reference to the fourth aspect, in a second implementation manner, the acquiring unit is specifically configured to acquire the control information delivered by the network device, in the following manner:

acquiring the first subframe information and first power control parameters for performing power control in the first subframe corresponding to the first subframe information, and the second subframe information and instruction information that instructs to transmit a D2D signal in the second subframe corresponding to the second subframe information by using maximum transmit power supported by a user equipment in D2D communication, where the first subframe information and the first power control parameters are delivered by the network device; and the transmitting unit is specifically configured to: transmit, according to the control information by using the transmit power determined according to the first power control manner, a D2D signal in the first subframe corresponding to the first subframe information, and transmit, according to the control information by using the transmit power determined according to the second power control manner, a D2D signal in the second subframe corresponding to the second subframe information, in the following manner:

transmitting, according to the first subframe information and the first power control parameters by using the transmit power determined according to the first power control parameters, a D2D signal in the first subframe corresponding to the first subframe information; and transmitting, according to the second subframe information and the instruction information by using the maximum transmit power supported by the user equipment in D2D communication, a D2D signal in the second subframe corresponding to the second subframe information.

With reference to the first implementation manner of the fourth aspect or the second implementation manner of the fourth aspect, in a third implementation manner, the transmit power used by the transmitting unit to transmit a D2D signal is specifically determined in the following manner:

determining, according to a path loss estimate, target receive power that is delivered by the network device and at which the network device receives an uplink signal, and a path loss compensation factor delivered by the network device, the transmit power for transmitting a D2D signal; or determining, according to a path loss estimate, target receive power that is delivered by the network device and at which the network device receives an uplink signal, a path loss compensation factor delivered by the network device, and a power offset delivered by the network device, the transmit power for transmitting a D2D signal.

According to a fifth aspect, a communication device is provided, and the communication device includes a transmitter, a processor, a memory, and a bus, where the transmitter and the memory are both connected to the processor through the bus, where:

the memory is configured to store program code executed by the processor;

the processor is configured to invoke the program stored in the memory and determine control information, where the control information includes first subframe information and a first power control manner in which power control is performed in a first subframe corresponding to the first subframe information, and second subframe information and a second power control manner in which power control is performed in a second subframe corresponding to the second subframe information; and the transmitter is configured to deliver the control information determined by the processor, so that a user equipment in D2D communication transmits, by using transmit power determined according to the first power control manner, a D2D signal in the first subframe corresponding to the first subframe information, and transmits, by using transmit power determined according to the second power control manner, a D2D signal in the second subframe corresponding to the second subframe information.

With reference to the fifth aspect, in a first implementation manner, the processor is specifically configured to determine the control information in the following manner: determining the first subframe information and first power control parameters for performing power control in the first subframe corresponding to the first subframe information, and the second subframe information and second power control parameters for performing power control in the second subframe corresponding to the second subframe information, where values of the first power control parameters are different from values of the second power control parameters; and the transmitter is specifically configured to deliver the control information in the following manner, so that the user equipment in D2D communication transmits, by using the transmit power determined according to the first power control manner, a D2D signal in the first subframe corresponding to the first subframe information, and transmits, by using the transmit power determined according to the second power control manner, a D2D signal in the second subframe corresponding to the second subframe information:

delivering the first subframe information, the first power control parameters, the second subframe information, and the second power control parameters, so that the user equipment in D2D communication transmits, by using the transmit power determined according to the first power control parameters, a D2D signal in the first subframe corresponding to the first subframe information, and transmits, by using the transmit power determined according to the second power control parameters, a D2D signal in the second subframe corresponding to the second subframe information.

With reference to the fifth aspect, in a second implementation manner, the processor is specifically configured to determine the control information in the following manner: determining the first subframe information and first power control parameters for performing power control in the first subframe corresponding to the first subframe information, and the second subframe information and instruction information that instructs to transmit a D2D signal in the second subframe by using maximum transmit power supported by the user equipment in D2D communication; and the transmitter is specifically configured to deliver the control information in the following manner, so that the user equipment in D2D communication transmits, by using the transmit power determined according to the first power control manner, a D2D signal in the first subframe corresponding to the first subframe information, and transmits, by using the transmit power determined according to the second power control manner, a D2D signal in the second subframe corresponding to the second subframe information:

delivering the first subframe information, the first power control parameters, the second subframe information, and the instruction information, so that the user equipment in D2D communication transmits, by using the transmit power determined according to the first power control parameters, a D2D signal in the first subframe corresponding to the first subframe information, and transmits, by using the maximum transmit power supported by the user equipment in D2D communication, a D2D signal in the second subframe corresponding to the second subframe information.

With reference to the first implementation manner of the fifth aspect or the second implementation manner of the fifth aspect, in a third implementation manner, the power control parameter determined by the processor includes:

a path loss compensation factor and target receive power at which a network device receives an uplink signal; or a path loss compensation factor, a power offset, and target receive power at which a network device receives an uplink signal.

According to a sixth aspect, a communication device is provided, and the communication device includes a receiver, a processor, a memory, a transmitter, and a bus, where the receiver, the transmitter, and the memory are all connected to the processor through the bus, where:

the memory is configured to store program code executed by the processor;

the receiver is configured to acquire control information delivered by a network device, where the control information includes first subframe information and a first power control manner in which power control is performed in a first subframe corresponding to the first subframe information, and second subframe information and a second power control manner in which power control is performed in a second subframe corresponding to the second subframe information; and the processor is configured to: invoke the program stored in the memory; and according to the control information acquired by the receiver, control the transmitter to transmit, by using transmit power determined according to the first power control manner, a D2D signal in the first subframe corresponding to the first subframe information, and to transmit, by using transmit power determined according to the second power control manner, a D2D signal in the second subframe corresponding to the second subframe information.

With reference to the sixth aspect, in a first implementation manner, the receiver is specifically configured to acquire the control information delivered by the network device, in the following manner:

acquiring the first subframe information and first power control parameters for performing power control in the first subframe corresponding to the first subframe information, and the second subframe information and second power control parameters for performing power control in the second subframe corresponding to the second subframe information, where the first subframe information and the first power control parameters are delivered by the network device, and values of the first power control parameters are different from values of the second power control parameters; and the processor is specifically configured to: according to the control information acquired by the receiver, control the transmitter to transmit, by using the transmit power determined according to the first power control manner, a D2D signal in the first subframe corresponding to the first subframe information, and to transmit, by using the transmit power determined according to the second power control manner, a D2D signal in the second subframe corresponding to the second subframe information, in the following manner:

according to the first subframe information and the first power control parameters, controlling the transmitter to transmit, by using the transmit power determined according to the first power control parameters, a D2D signal in the first subframe corresponding to the first subframe information; and according to the second subframe information and the second power control parameters, controlling the transmitter to transmit, by using the transmit power determined according to the second power control parameters, a D2D signal in the second subframe corresponding to the second subframe information.

With reference to the sixth aspect, in a second implementation manner, the receiver is specifically configured to acquire the control information delivered by the network device, in the following manner:

acquiring the first subframe information and first power control parameters for performing power control in the first subframe corresponding to the first subframe information, and the second subframe information and instruction information that instructs to transmit a D2D signal in the second subframe corresponding to the second subframe information by using maximum transmit power supported by a user equipment in D2D communication, where the first subframe information and the first power control parameters are delivered by the network device; and the processor is specifically configured to: according to the control information acquired by the receiver, control the transmitter to transmit, by using the transmit power determined according to the first power control manner, a D2D signal in the first subframe corresponding to the first subframe information, and to transmit, by using the transmit power determined according to the second power control manner, a D2D signal in the second subframe corresponding to the second subframe information, in the following manner:

according to the first subframe information and the first power control parameters, controlling the transmitter to transmit, by using the transmit power determined according to the first power control parameters, a D2D signal in the first subframe corresponding to the first subframe information; and according to the second subframe information and the instruction information, controlling the transmitter to transmit, by using the maximum transmit power supported by the user equipment in D2D communication, a D2D signal in the second subframe corresponding to the second subframe information.

With reference to the first implementation manner of the sixth aspect or the second implementation manner of the sixth aspect, the transmit power that the processor controls the transmitter to use for transmitting a D2D signal is specifically determined in the following manner:

determining, according to a path loss estimate, target receive power that is delivered by the network device and at which the network device receives an uplink signal, and a path loss compensation factor delivered by the network device, the transmit power for transmitting a D2D signal; or determining, according to a path loss estimate, target receive power that is delivered by the network device and at which the network device receives an uplink signal, a path loss compensation factor delivered by the network device, and a power offset delivered by the network device, the transmit power for transmitting a D2D signal.

In the transmit power control method in D2D communication provided in the embodiments of the present invention, a network device determines and delivers control information for a user equipment in D2D communication to perform power control, where the control information includes first subframe information and a first power control manner in which power control is performed in a first subframe corresponding to the first subframe information, and second subframe information and a second power control manner in which power control is performed in a second subframe corresponding to the second subframe information. After receiving the control information determined and delivered by the network device, the user equipment in D2D communication can separately determine, by using different power control manners, transmit power for transmitting a D2D signal in the first subframe and the second subframe, so as to implement dynamic adjustment control on the transmit power used for transmitting a D2D signal in D2D communication. That is, compared with that a user equipment in D2D communication transmits a D2D signal only at maximum transmit power in the prior art, the user equipment in D2D communication in the embodiments of the present invention can flexibly control, according to an actual condition, the transmit power that a D2D communication device uses when transmitting a D2D signal, so that interference from the D2D signal to an uplink signal received by the network device can be restricted, thereby improving accuracy of receiving the uplink signal by the network device.

BRIEF DESCRIPTION OF THE DRAWINGS

Figure 1A:
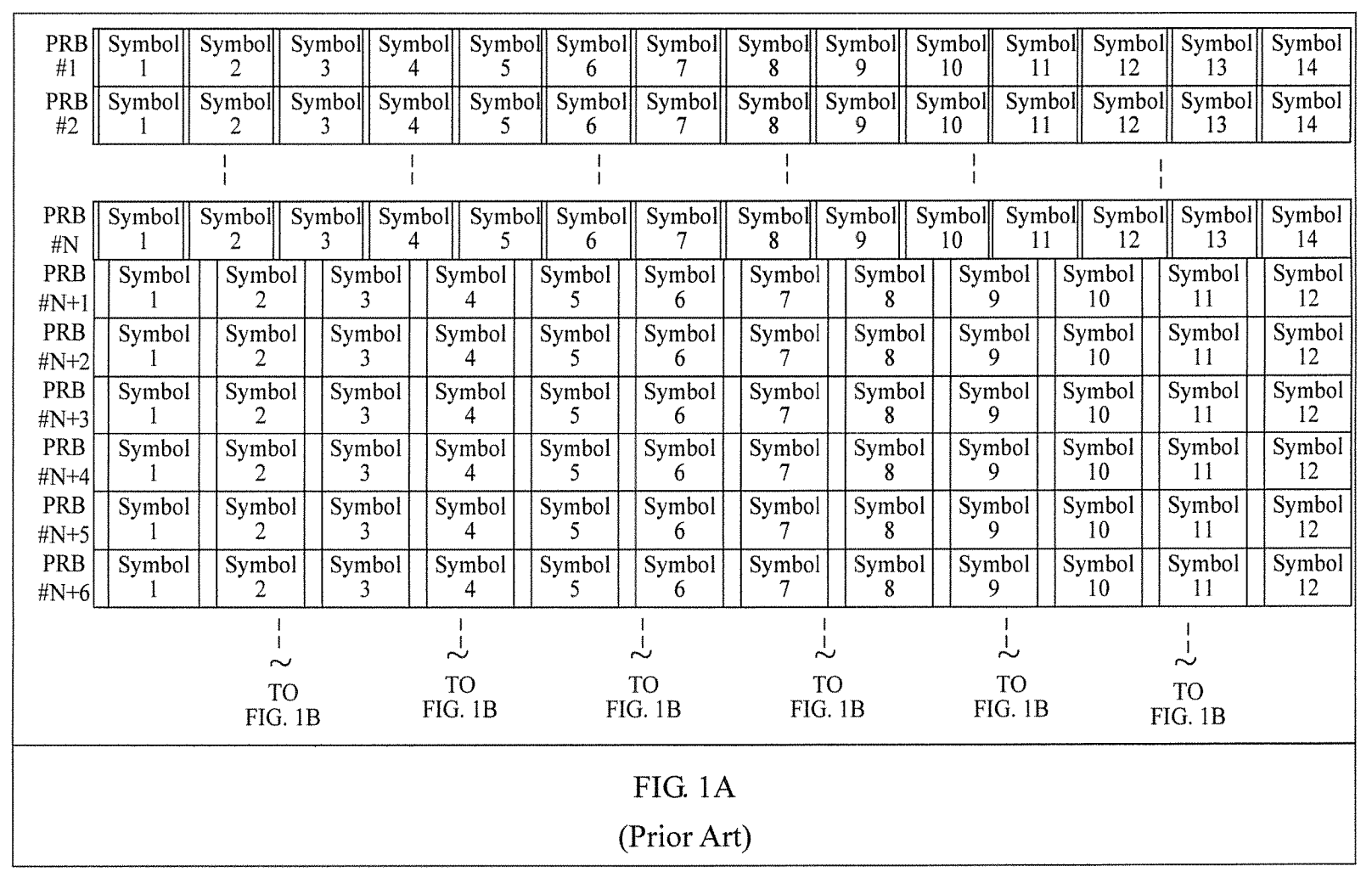
Figure 1B:
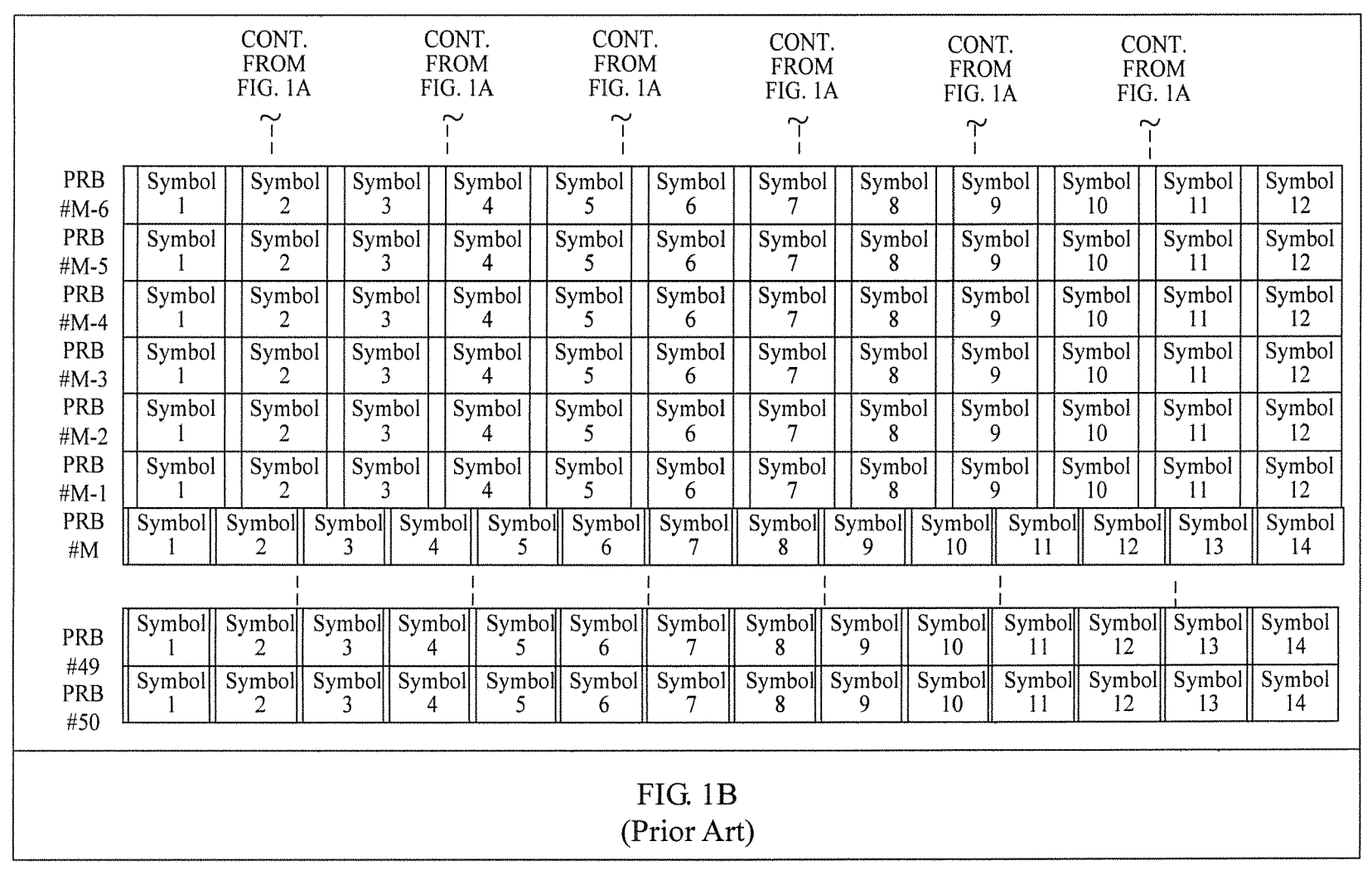

FIG. 1A and FIG. 1B are a schematic diagram of frequency division multiplexing of a D2D signal in D2D communication and an uplink signal in uplink communication in the prior art;

DETAILED DESCRIPTION

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the claims of the present invention.

Figure 2:
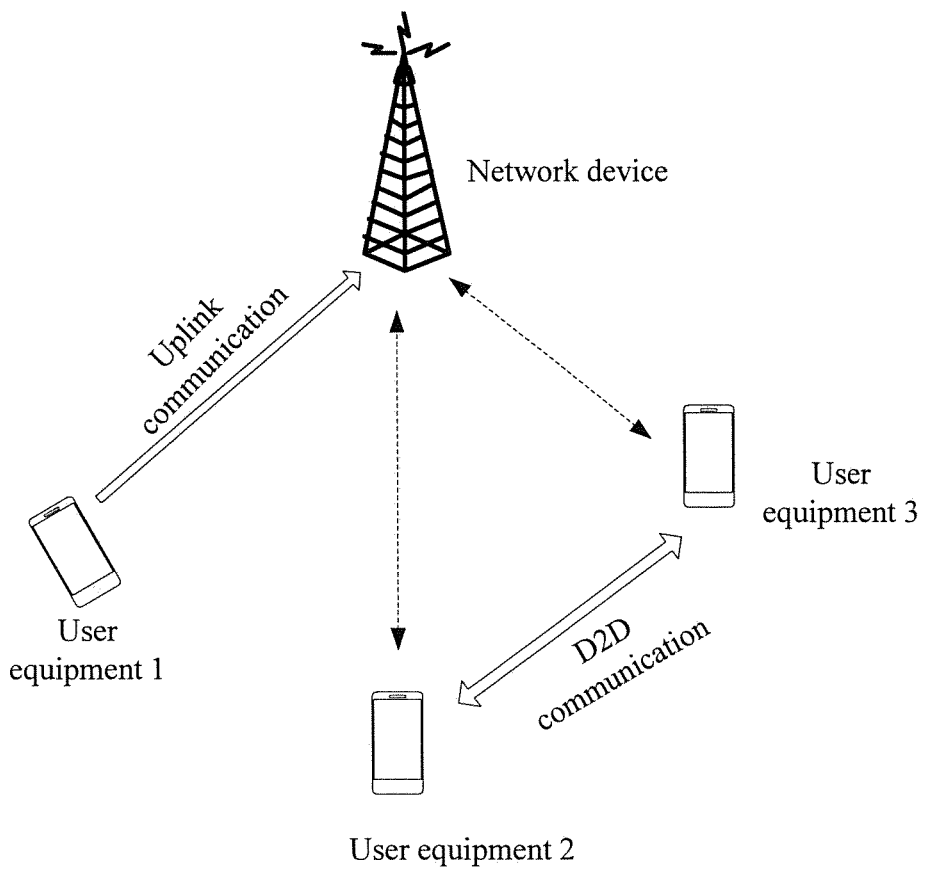
FIG. 2 is a diagram of a system architecture in which a transmit power control method in D2D communication is applied according to an embodiment of the present invention.

A transmit power control method and a device in D2D communication that are provided in the embodiments of the present invention are applied to a D2D communication technology, where the D2D communication technology can be applied to various communication scenarios, such as an LTE communication scenario, a 2G communication scenario, or a 3G communication scenario. For a schematic diagram of a process in which D2D communication is performed, refer to FIG. 2, and FIG. 2 shows a system architecture in which a transmit power control method in D2D communication provided in an embodiment of the present invention is applied. In FIG. 2, a user equipment 1 communicates with a network device, where the user equipment 1 transmits an uplink signal, and the network device receives the uplink signal transmitted by the user equipment 1, which is referred to as uplink communication. Device to device communication performed between a user equipment 2 and a user equipment 3 is D2D communication. A same spectrum resource can be used in the uplink communication between the user equipment 1 and the network device and in the D2D communication between the user equipment 2 and the user equipment 3, and a spectrum resource used in the D2D communication between the user equipment 2 and the user equipment 3 is allocated by the network device.

It should be noted that, the network device in the embodiments of the present invention may be an evolved NodeB (eNB) in an LTE system, or may be a NodeB (NB) in the Universal Mobile Telecommunications System (Universal Mobile Telecommunications System, UMTS), or may be another network device that communicates with a user equipment and performs resource scheduling for the user equipment, or the like.

In the transmit power control method in D2D communication provided in the embodiments of the present invention, a network device determines and delivers control information for a user equipment in D2D communication to perform power control; and the user equipment in D2D communication performs, according to the control information determined and delivered by the network device, power control on transmit power used for transmitting a D2D signal, so that interference from the D2D signal to an uplink signal received by the network device can be restricted, thereby improving reliability of receiving the uplink signal by the network device.

In the following, the present invention describes, in details with reference to specific embodiments, the transmit power control method and the device in D2D communication that are provided in the embodiments of the present invention.

Embodiment 1

In Embodiment 1 of the present invention, an example that a first device executes a transmit power control method in D2D communication provided in this embodiment of the present invention is used for description. The first device in this embodiment of the present invention may be a network device, in an existing communication system, that communicates with a user equipment and performs resource scheduling for the user equipment, but is not limited thereto; or may be another device that can execute a corresponding function.

In this embodiment of the present invention, an example that the network device executes the transmit power control method in D2D communication provided in this embodiment of the present invention is used for description in the following, but the present invention is certainly not limited thereto.

Figure 3A:
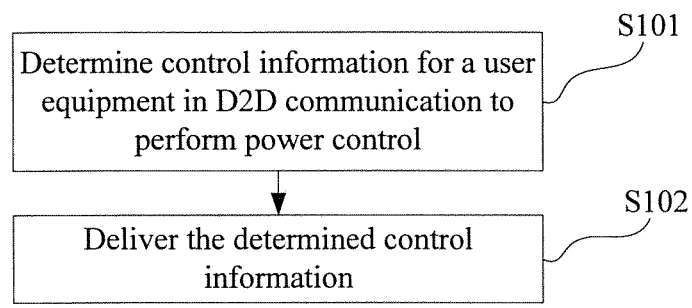
FIG. 3A is a first flowchart of implementing a transmit power control method in D2D communication according to Embodiment 1 of the present invention.

FIG. 3A is a flowchart of implementing the transmit power control method in D2D communication provided in this embodiment of the present invention. As shown in FIG. 3A, the method includes:

S101: The network device determines control information for a user equipment in D2D communication to perform power control.

In this embodiment of the present invention, the control information determined by the network device includes first subframe information and a first power control manner in which power control is performed in a first subframe corresponding to the first subframe information, and second subframe information and a second power control manner in which power control is performed in a second subframe corresponding to the second subframe information.

S102: The network device delivers the control information determined in step S101.

In this embodiment of the present invention, the network device may deliver the determined control information by using signaling, so that the user equipment in D2D communication transmits, according to the control information by using transmit power determined according to the first power control manner, a D2D signal in the first subframe corresponding to the first subframe information, and transmits, according to the control information by using transmit power determined according to the second power control manner, a D2D signal in the second subframe corresponding to the second subframe information.

In the transmit power control method in D2D communication provided in this embodiment of the present invention, a network device determines and delivers control information for a user equipment in D2D communication to perform power control, where the control information includes first subframe information and a first power control manner in which power control is performed in a first subframe corresponding to the first subframe information, and second subframe information and a second power control manner in which power control is performed in a second subframe corresponding to the second subframe information. After receiving the control information determined and delivered by the network device, the user equipment in D2D communication can separately determine, by using different power control manners, transmit power for transmitting a D2D signal in the first subframe and the second subframe, so as to implement dynamic adjustment control on the transmit power used for transmitting a D2D signal in D2D communication. That is, compared with that a user equipment in D2D communication transmits a D2D signal only at maximum transmit power in the prior art, the user equipment in D2D communication in this embodiment of the present invention can flexibly control, according to an actual condition, transmit power that a D2D communication device uses when transmitting a D2D signal, so that interference from the D2D signal to an uplink signal received by the network device can be restricted, thereby improving accuracy of receiving the uplink signal by the network device.

In this embodiment of the present invention, the network device may determine control information according to a manner in which the user equipment in D2D communication performs power control. For example, the network device in this embodiment of the present invention may determine and deliver subframe information and a power control parameter for the user equipment in D2D communication to perform power control on a subframe corresponding to the subframe information, so that the user equipment in D2D communication determines, according to the received subframe information and the received power control parameter corresponding to the subframe information, transmit power for transmitting a D2D signal, and then transmits the D2D signal by using the determined transmit power.

Power control includes two manners: open-loop power control and closed-loop power control. In this embodiment of the present invention, the network device may determine and deliver a corresponding power control parameter according to whether the manner in which the user equipment in D2D communication performs power control is an open-loop power control manner or a closed-loop power control manner. For example, when the open-loop power control manner is used, the network device may determine power control parameters such as target receive power at which the network device receives an uplink signal and a path loss compensation factor; and when the closed-loop power control manner is used, the network device may determine power control parameters such as target receive power at which the network device receives an uplink signal, a path loss compensation factor, and a power offset.

In this embodiment of the present invention, a manner in which the user equipment in D2D communication determines transmit power for transmitting a D2D signal varies with a power control parameter delivered by the network device.

Manner 1 in which the user equipment in D2D communication determines transmit power for transmitting a D2D signal:

When the network device delivers power control parameters such as target receive power at which the network device receives an uplink signal and a path loss compensation factor, the user equipment in D2D communication may use the open-loop power control manner to determine, according to the following formula (1) and a path loss estimate, the target receive power that is delivered by the network device and at which the network device receives an uplink signal, and the path loss compensation factor delivered by the network device, transmit power for transmitting a D2D signal.

$$P_{D2D}=P_O+\alpha \cdot PL \qquad \text{Formula (1), where:}$$

$P_{D2D}$ is the transmit power that is for transmitting a D2D signal and determined by the D2D communication device, $P_O$ is the target receive power at which the network device receives an uplink signal, $\alpha \in \{0, 0.4, 0.5, 0.6, 0.7, 0.8, 0.9, 1\}$ is the path loss compensation factor, and PL is a path loss estimate (Pathloss Estimate) that is between the network device and the user equipment in D2D communication and obtained by the user equipment in D2D communication by means of calculation. PL may be a difference between transmit power at which a system sends a reference signal and receive power that is of the reference signal and detected by the user equipment.

Manner 2 in which the user equipment in D2D communication determines transmit power for transmitting a D2D signal:

When the network device delivers power control parameters such as target receive power at which the network device receives an uplink signal, a path loss compensation factor, and a power offset, the user equipment in D2D communication may use the closed-loop power control manner to determine, according to the following formula (2) and a path loss estimate, the target receive power that is delivered by the network device and at which the network device receives an uplink signal, and the path loss compensation factor and the power offset that are delivered by the network device, the transmit power for transmitting a D2D signal.

$$P_{D2D}=P_O+\alpha \cdot PL+\sigma P \qquad \text{Formula (2), where:}$$

$P_{D2D}$ is the transmit power that is for transmitting a D2D signal and determined by the D2D communication device, $P_O$ is the target receive power at which the network device receives an uplink signal, $\alpha \in \{0, 0.4, 0.5, 0.6, 0.7, 0.8, 0.9, 1\}$ is the path loss compensation factor, $\sigma P$ is the power offset, and PL is a path loss estimate (Pathloss Estimate) that is between the network device and the user equipment in D2D communication and obtained by the user equipment in D2D communication by means of calculation. PL may be a difference between transmit power at which a system sends a reference signal and receive power that is of the reference signal and detected by the user equipment.

In this embodiment of the present invention, the target receive power $P_O$ at which the network device receives an uplink signal, the path loss compensation factor $\alpha$, and the power offset $\sigma P$ are all set by the network device according to an actual communication condition and delivered to the user equipment in D2D communication; and PL is obtained by the user equipment by means of measurement.

In this embodiment of the present invention, an example that the D2D communication device uses the open-loop power control manner to determine transmit power of a D2D signal is used for description. It is assumed that the target receive power $P_O$ at which the network device receives an uplink signal is set to −90 dBm, the path loss compensation factor $\alpha=1$, and the path loss PL obtained by the user equipment in D2D communication by means of measurement is 100 dB. Then, the transmit power that is of a D2D signal and determined by the user equipment in D2D communication is −90 dBm+100 dB=10 dBm. For another example, if the path loss PL obtained by the user equipment in D2D communication by means of measurement is 80 dB, the transmit power that is of a D2D signal and determined by the user equipment in D2D communication is −90 dBm+80 dB=−10 dBm.

In this embodiment of the present invention, the network device determines and delivers the power control parameter for the user equipment in D2D communication to perform power control, and the user equipment in D2D communication performs, according to the power control parameter determined and delivered by the network device, power control on transmit power for transmitting a D2D signal. Therefore, in this embodiment of the present invention, the user equipment in D2D communication may not transmit a D2D signal at maximum transmit power. The user equipment in D2D communication may adapt the transmit power for transmitting a D2D signal to different power control parameters that are determined and delivered by the network device and that are corresponding to different transmit power, so as to implement power control on the transmit power for transmitting a D2D signal in D2D communication, and to restrict interference from the D2D signal to an uplink signal received by the network device. For example, the network device may determine a power control parameters with a relatively small value, so that the transmit power that is of a D2D signal and determined by the user equipment in D2D communication is also relatively small, and then interference from the D2D signal to the uplink signal received by the network device may be reduced, thereby improving reliability of receiving the uplink signal by the network device.

In this embodiment of the present invention, in order to reduce interference from a D2D signal transmitted by the user equipment in D2D communication to an uplink signal received by the network device, when performing power control, the user equipment in D2D communication may use, on some or all subframes, a manner in which transmit power is determined according to power control parameters and in which power control is performed.

Compared with that transmit power of a D2D signal is maximum transmit power in the prior art, transmit power of a D2D signal in this embodiment of the present invention may be reduced by controlling the transmit power of a D2D signal, which can restrict interference from the D2D signal to an uplink signal received by the network device. However, if the transmit power of a D2D signal is reduced, an effective range in which the user equipment performs D2D communication may also be reduced accordingly, thereby affecting a coverage range of the D2D signal.

Preferably, this embodiment of the present invention provides a method for controlling transmit power of a D2D signal, where the method can not only reduce interference from a D2D signal to an uplink signal received by the network device, but also ensure a coverage range of the D2D signal to some degree.

For example, the network device in this embodiment of the present invention may determine that values of power control parameters in some subframes are relatively small, so that transmit power of a D2D signal in this part of subframes is also relatively small, so as to reduce interference from the D2D signal to an uplink signal received by the network device; and determine that values of power control parameters in other subframes are relatively large, so that transmit power of a D2D signal is also relatively large, so as to ensure coverage of the D2D signal.

In a preferable embodiment of the present invention, a network device may determine that in all subframes used for transmitting a D2D signal, a power control manner is used as a manner of determining transmit power of a D2D signal.

In this embodiment of the present invention, the subframes used for transmitting a D2D signal are divided into at least two types, and different types of subframes are corresponding to different power control parameters, so that a user equipment in D2D communication may determine and obtain different transmit power of a D2D signal. Interference from a D2D signal in a subframe in which transmit power used for transmitting a D2D signal is relatively small to an uplink signal received by the network device is also relatively weak, which has a protective function on the uplink signal received by the network device. A D2D signal in a subframe in which transmit power used for transmitting a D2D signal is relatively large can ensure coverage of the D2D signal.

The present invention in the following uses an example that the control information determined by the network device includes the first subframe information and first power control parameters for performing power control in the first subframe corresponding to the first subframe information, and the second subframe information and second power control parameters for performing power control in the second subframe corresponding to the second subframe information for description, where values of the first power control parameters are different from values of the second power control parameters.

Figure 3B:
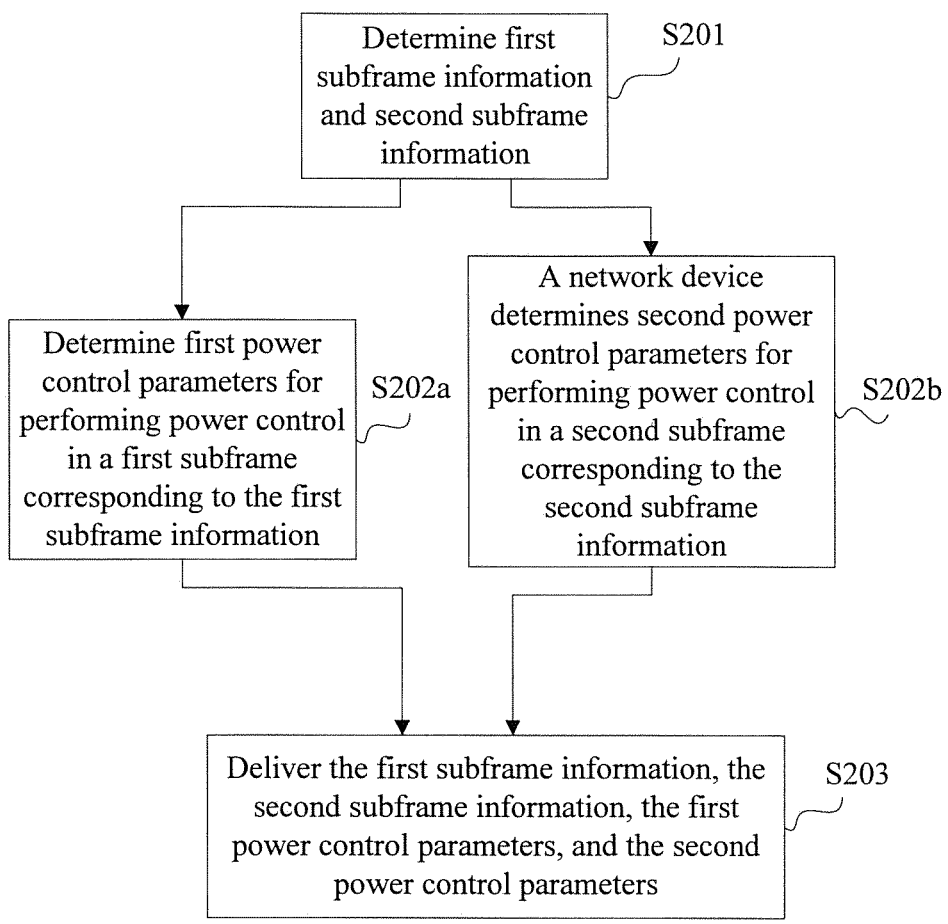
FIG. 3B is a second flowchart of implementing a transmit power control method in D2D communication according to Embodiment 1 of the present invention.

FIG. 3B is another flowchart of implementing a method for performing power control on transmit power of a D2D signal in D2D communication provided in this embodiment of the present invention. As shown in FIG. 3B, the method includes:

S201: A network device determines first subframe information and second subframe information.

In this embodiment of the present invention, both in a first subframe corresponding to the first subframe information and in a second subframe corresponding to the second subframe information, a D2D signal is transmitted by using transmit power determined according to power control parameters.

S202a: The network device determines first power control parameters for performing power control in a first subframe corresponding to the first subframe information.

S202b: The network device determines second power control parameters for performing power control in a second subframe corresponding to the second subframe information.

Figure 3C:
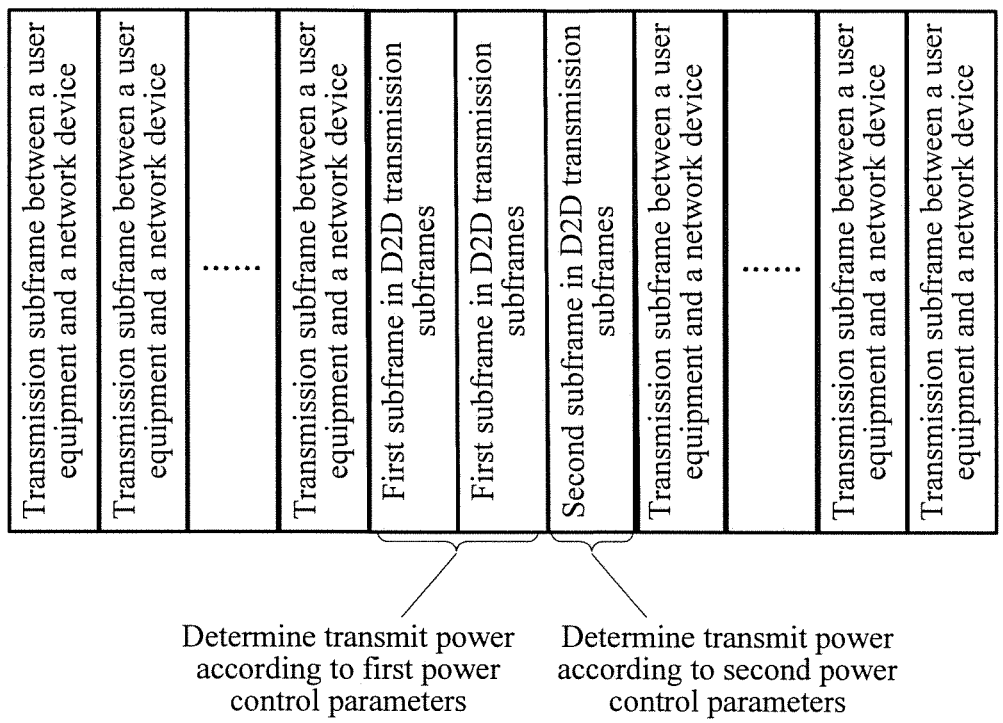
FIG. 3C is a first schematic diagram of D2D subframe division and power control parameters corresponding to D2D subframes according to Embodiment 1 of the present invention.

Subframes in a D2D communication system include a transmission subframe that is between a user equipment and the network device and that is used for transmitting an uplink signal, and a D2D transmission subframe used for transmitting a D2D signal. In this embodiment of the present invention, the network device divides the D2D transmission subframe used for transmitting a D2D signal into a first subframe and a second subframe. As shown in FIG. 3C, in the first subframe, transmit power of a D2D signal is controlled by using the first power control parameters; and in the second subframe, transmit power of a D2D signal is controlled by using the second power control parameters.

In this embodiment of the present invention, values of the first power control parameters are different from values of the second power control parameters, so that transmit power for transmitting a D2D signal by using the first subframe is different from transmit power for transmitting a D2D signal by using the second subframe. Therefore, a D2D signal whose transmit power is relatively small can reduce interference from the D2D signal to an uplink signal received by the network device; and a D2D signal whose transmit power is relatively large can ensure coverage of the D2D signal.

For example, in this embodiment of the present invention, it may be determined that, in the first power control parameters corresponding to the first subframe, target receive power at which the network device receives an uplink signal is $P_{O,1}$, and a path loss compensation factor $\alpha$ is 1. Then, transmit power that is determined by a user equipment in D2D communication and for transmitting a D2D signal by using the first subframe is $P_{D2D}=P_{O,1}+\alpha \cdot PL$. In this embodiment of the present invention, it may be determined that, in the second power control parameters corresponding to the second subframe, target receive power at which the network device receives an uplink signal is $P_{O,2}$, and a path loss compensation factor $\alpha$ is 1. Then, transmit power that is determined by the user equipment in D2D communication and for transmitting a D2D signal by using the second subframe is $P_{D2D}=P_{O,2}+\alpha \cdot PL$. In this embodiment of the present invention, the network device determines that $P_{O,1}<P_{O,2}$. Therefore, compared with the transmit power for transmitting a D2D signal by using the second subframe, the transmit power for transmitting a D2D signal by using the first subframe by the user equipment in D2D communication is relatively small, so that the uplink signal received by the network device may be protected by using the first subframe and the first power control parameters, and interference from the D2D signal may be reduced. Coverage of a D2D signal may be ensured by using the second subframe and the second power control parameters.

It should be noted that step S202a and step S202b in this embodiment of the present invention are not performed in an order of sequence.

It should further be noted that, in this embodiment of the present invention, which part of subframes is specifically determined as the first subframe by the network device and which part of subframes is specifically determined as the second subframe by the network device may be determined according to an actual communication requirement. In addition, the number of types of the determined subframes is not limited to two types, and there may be more than two types. FIG. 3C in this embodiment of the present invention only gives a schematic description, and the present invention is not limited thereto.

S203: The network device delivers the first subframe information and the second subframe information that are determined in step S201, the first power control parameters determined in step S202a, and the second power control parameters determined in step S202b, so that a user equipment in D2D communication transmits, by using transmit power determined according to the first power control parameters, a D2D signal in the first subframe corresponding to the first subframe information, and transmits, by using transmit power determined according to the second power control parameters, a D2D signal in the second subframe corresponding to the second subframe information.

In this embodiment of the present invention, the transmit power for transmitting a D2D signal by using the first subframe is different from the transmit power for transmitting a D2D signal by using the second subframe. Therefore, a D2D signal whose transmit power is relatively small can reduce interference from the D2D signal to an uplink signal received by the network device; and a D2D signal whose transmit power is relatively large can ensure coverage of the D2D signal.

In another preferable embodiment of the present invention, a network device may determine that on some subframes of subframes used for transmitting a D2D signal, a power control manner in which transmit power is determined according to power control parameters is used; and that on other subframes, a power control manner in which maximum transmit power supported by a user equipment in D2D communication is still used as transmit power of a D2D signal is used. In this embodiment of the present invention, according to subframe information and a corresponding power control parameter that are determined and delivered by the network device, a user equipment of a D2D signal determines transmit power for transmitting a D2D signal by using a corresponding subframe. In this embodiment of the present invention, on some subframes, a D2D signal is transmitted by using transmit power on which power control is performed, so as to reduce interference from the D2D signal to an uplink signal received by the network device, thereby improving reliability of receiving the uplink signal by the network device. On other subframes, a D2D signal is transmitted by using the maximum transmit power supported by the user equipment in D2D communication, which can ensure coverage of the D2D signal.

Figure 3D:
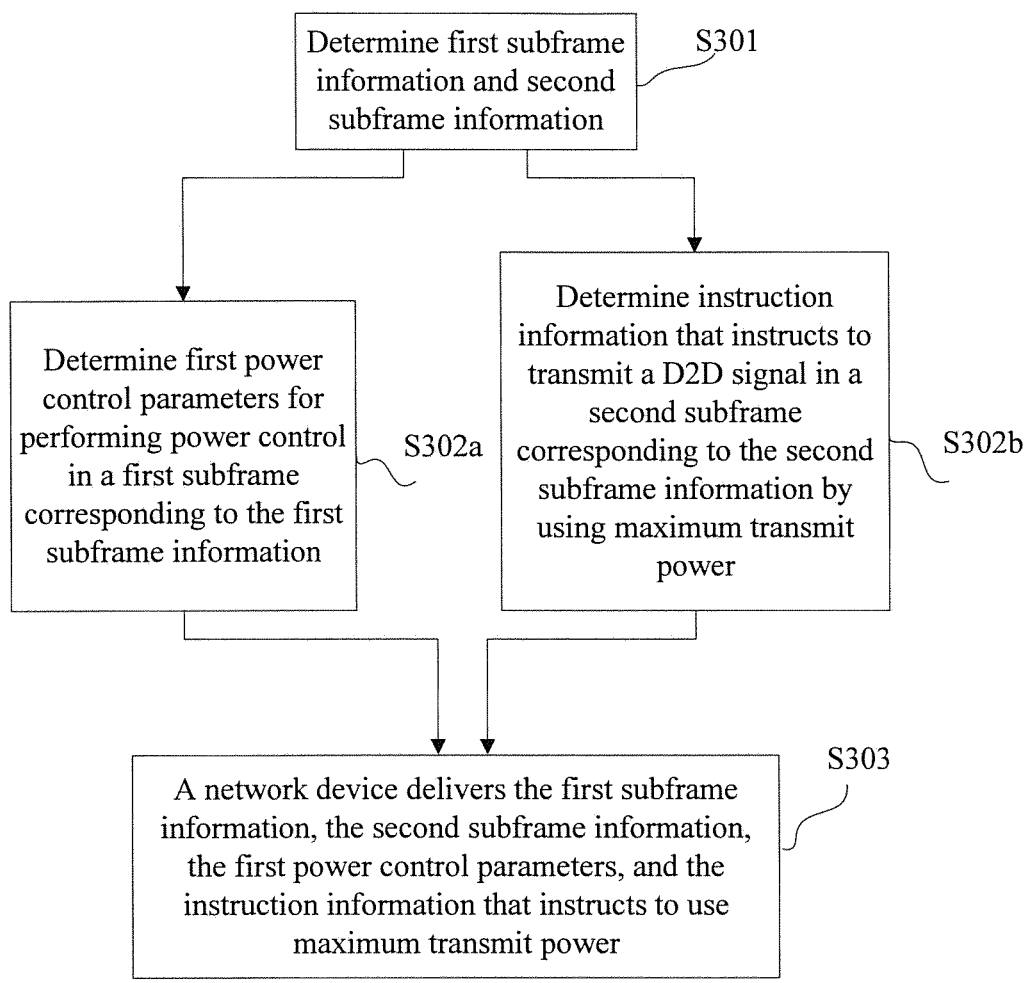
FIG. 3D is a third flowchart of implementing a transmit power control method in D2D communication according to Embodiment 1 of the present invention.

FIG. 3D is still another flowchart of implementing a method for performing power control on transmit power of a D2D signal in D2D communication provided in this embodiment of the present invention. As shown in FIG. 3D, the method includes:

S301: A network device determines first subframe information and second subframe information.

In this embodiment of the present invention, in a first subframe corresponding to the first subframe information, a D2D signal is transmitted by using transmit power determined according to power control parameters; and in a second subframe corresponding to the second subframe information, a D2D signal is transmitted by using maximum transmit power.

S302a: The network device determines first power control parameters for performing power control in a first subframe corresponding to the first subframe information.

S302b: The network device determines instruction information that instructs to transmit a D2D signal in a second subframe corresponding to the second subframe information by using maximum transmit power supported by a user equipment in D2D communication.

It should be noted that step S302a and step S302b in this embodiment of the present invention are not performed in an order of sequence.

S303: The network device delivers the first subframe information and the second subframe information that are determined in step S301, the first power control parameters determined in step S302a, and the instruction information determined in step S302b, so that the user equipment in D2D communication transmits, by using the transmit power determined according to the first power control parameters, a D2D signal in the first subframe corresponding to the first subframe information, and transmits, by using the maximum transmit power, a D2D signal in the second subframe corresponding to the second subframe information.

Figure 3E:
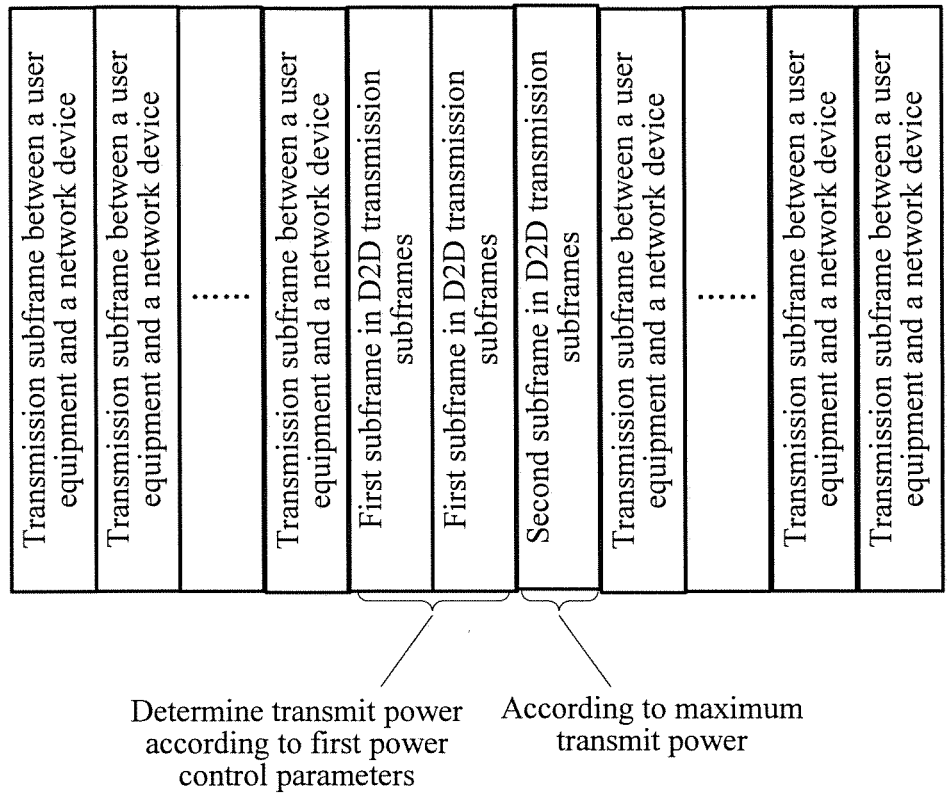
FIG. 3E is a second schematic diagram of D2D subframe division and power control parameters corresponding to D2D subframes according to Embodiment 1 of the present invention.

Subframes in a D2D communication system include a transmission subframe that is between a user equipment and the network device and that is used for transmitting an uplink signal, and a D2D transmission subframe used for transmitting a D2D signal. In this embodiment of the present invention, the network device divides the D2D transmission subframe used for transmitting a D2D signal into a first subframe and a second subframe. As shown in FIG. 3E, in the first subframe corresponding to the first subframe information, a D2D signal is transmitted by using transmit power determined according to the power control parameter; and in the second subframe corresponding to the second subframe information, a D2D signal is transmitted by using the maximum transmit power.

In this embodiment of the present invention, the transmit power for transmitting a D2D signal by using the first subframe is determined according to the first power control parameters; and a D2D signal transmitted by using the second subframe is still transmitted at the maximum transmit power, so that the transmit power for transmitting a D2D signal by using the first subframe is different from transmit power for transmitting a D2D signal by using the second subframe. The transmit power for transmitting a D2D signal by using the first subframe is relatively small, so that interference from the D2D signal to an uplink signal received by the network device can be reduced, thereby improving reliability of receiving the uplink signal by the network device. The transmit power for transmitting a D2D signal by using the second subframe is maximum power, and the transmit power of a D2D signal is relatively large, which can ensure coverage of the D2D signal.

It should be noted that, in this embodiment of the present invention, which part of subframes is specifically determined as the first subframe by the network device and which part of subframes is specifically determined as the second subframe by the network device may be determined according to an actual communication requirement. In addition, the determined first subframes may also be divided into different types, and different types of first subframes are corresponding to different power control parameters. FIG. 3E in this embodiment of the present invention only gives a schematic description, and the present invention is not limited thereto.

In this embodiment of the present invention, a network device determines and delivers subframe information, a power control parameter for performing power control on a subframe corresponding to the subframe information, and instruction information that instructs a user equipment in D2D communication to use maximum transmit power, so that the user equipment can determine, according to the subframe information and the power control parameter that are determined and delivered by the network device, transmit power for transmitting a D2D signal on some subframes; and directly use, according to the instruction information, the maximum transmit power to transmit a D2D signal on other subframes. In this embodiment of the present invention, the user equipment in D2D communication may not necessarily use the maximum transmit power supported by the user equipment in 2D communication to transmit a D2D signal on all subframes. The user equipment in D2D communication determines, according to the power control parameter, the transmit power used for transmitting a D2D signal, where the transmit power can adapt to the subframe information and the power control parameter that are determined and delivered by the network device. On some subframes, a D2D signal is transmitted by using transmit power less than the maximum transmit power supported by the user equipment in D2D communication, so as to restrict interference from the D2D signal to an uplink signal received by the network device, thereby improving reliability of receiving the uplink signal by the network device. A D2D signal that is transmitted by using the maximum transmit power can ensure coverage of the D2D signal.

Embodiment 2

An example that a second device executes a transmit power control method in D2D communication provided in this embodiment of the present invention is used for description in Embodiment 2 of the present invention. The second device in this embodiment of the present invention may be a user equipment in D2D communication, but certainly is not limited thereto. In this embodiment of the present invention, only the user equipment in D2D communication is used as an example for description in the following.

Figure 4A:
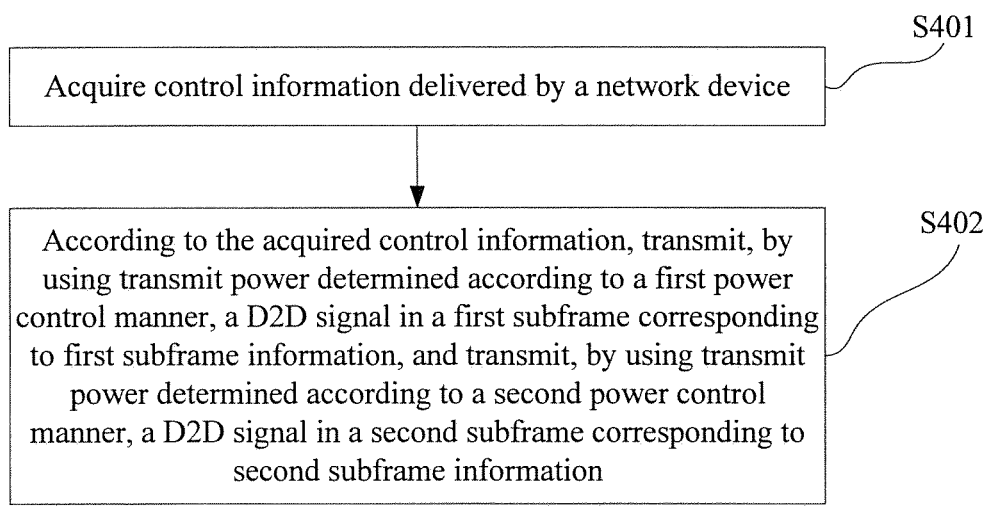
FIG. 4A is a first flowchart of implementing a transmit power control method in D2D communication according to Embodiment 2 of the present invention.

FIG. 4A is a flowchart of implementing the transmit power control method in D2D communication provided in this embodiment of the present invention, where the method is executed by the user equipment in D2D communication. As shown in FIG. 4A, the method includes:

S401: The user equipment in D2D communication acquires control information delivered by a network device.

In this embodiment of the present invention, the user equipment in D2D communication may acquire, by parsing an instruction delivered by the network device, the control information delivered by the network device. In this embodiment of the present invention, the control information acquired by the user equipment in D2D communication includes first subframe information and a first power control manner in which power control is performed in a first subframe corresponding to the first subframe information, and second subframe information and a second power control manner in which power control is performed in a second subframe corresponding to the second subframe information.

In this embodiment of the present invention, the control information acquired by the user equipment in D2D communication may include subframe information and a power control parameter for performing power control on a subframe corresponding to the subframe information. The user equipment in D2D communication determines, according to the subframe information and the power control parameters corresponding to the subframe information, transmit power for transmitting a D2D signal, and then transmits the D2D signal by using the determined transmit power.

The power control parameters may include different power control parameters delivered by the network device according to whether a manner in which the user equipment in D2D communication performs power control is an open-loop power control manner or a closed-loop power control manner. For example, when the open-loop power control manner is used, the user equipment in D2D communication may acquire power control parameters determined and delivered by the network device, such as target receive power at which the network device receives an uplink signal and a path loss compensation factor; and when the closed-loop power control manner is used, the user equipment in D2D communication may acquire power control parameters determined and delivered by the network device, such as target receive power at which the network device receives an uplink signal, a path loss compensation factor, and a power offset.

S402: According to the control information acquired in step S401, the user equipment in D2D communication transmits, by using transmit power determined according to a first power control manner, a D2D signal in a first subframe corresponding to first subframe information, and transmits, by using transmit power determined according to a second power control manner, a D2D signal in a second subframe corresponding to second subframe information.

In this embodiment of the present invention, the user equipment in D2D communication may transmit, according to different control information delivered by the network device, a D2D signal by using transmit power determined according to different power control manners.

In this embodiment of the present invention, when determining transmit power according to power control parameters, the user equipment in D2D communication may determine transmit power of a D2D signal by using the open-loop power control manner or the closed-loop power control manner, and the following manner may be specifically used:

determining the transmit power according to a path loss estimate, target receive power that is delivered by the network device and at which the network device receives an uplink signal, and a path loss compensation factor delivered by the network device; or determining the transmit power according to a path loss estimate, target receive power that is delivered by the network device and at which the network device receives an uplink signal, a path loss compensation factor delivered by the network device, and a power offset delivered by the network device.

For a process in which the transmit power is determined according to the power control parameters in this embodiment of the present invention, refer to related manners described in Embodiment 1, and details are not described herein again.

In the transmit power control method in D2D communication provided in this embodiment of the present invention, a user equipment in D2D communication acquires control information that is delivered by a network device and for the user equipment in D2D communication to perform power control, where the control information includes first subframe information and a first power control manner in which power control is performed in a first subframe corresponding to the first subframe information, and second subframe information and a second power control manner in which power control is performed in a second subframe corresponding to the second subframe information. The user equipment in D2D communication can separately determine, by using different power control manners, transmit power for transmitting a D2D signal in the first subframe and the second subframe, so as to implement dynamic adjustment control on the transmit power used for transmitting a D2D signal in D2D communication. That is, compared with that a user equipment in D2D communication transmits a D2D signal only at maximum transmit power in the prior art, the user equipment in D2D communication in this embodiment of the present invention can flexibly control, according to an actual condition, the transmit power that a D2D communication device uses when transmitting a D2D so that interference from the D2D signal to an uplink signal received by the network device can be restricted, thereby improving accuracy of receiving the uplink signal by the network device.

In this embodiment of the present invention, the user equipment in D2D communication no longer transmits a D2D signal only at maximum transmit power. The user equipment in D2D communication may adapt the transmit power for transmitting a D2D signal to different power control parameters that are delivered by the network device and that are corresponding to different transmit power, so as to implement power control on the transmit power for transmitting a D2D signal in D2D communication, and to restrict interference from the D2D signal to an uplink signal received by the network device. However, if the transmit power of a D2D signal is reduced, an effective range in which the user equipment in D2D communication performs D2D communication may also be reduced accordingly, thereby affecting a coverage range of the D2D signal.

This embodiment of the present invention provides a method for controlling transmit power of a D2D signal, where the method can not only reduce interference from a D2D signal to an uplink signal received by the network device, but also ensure a coverage range of the D2D signal to some degree.

Figure 4B:
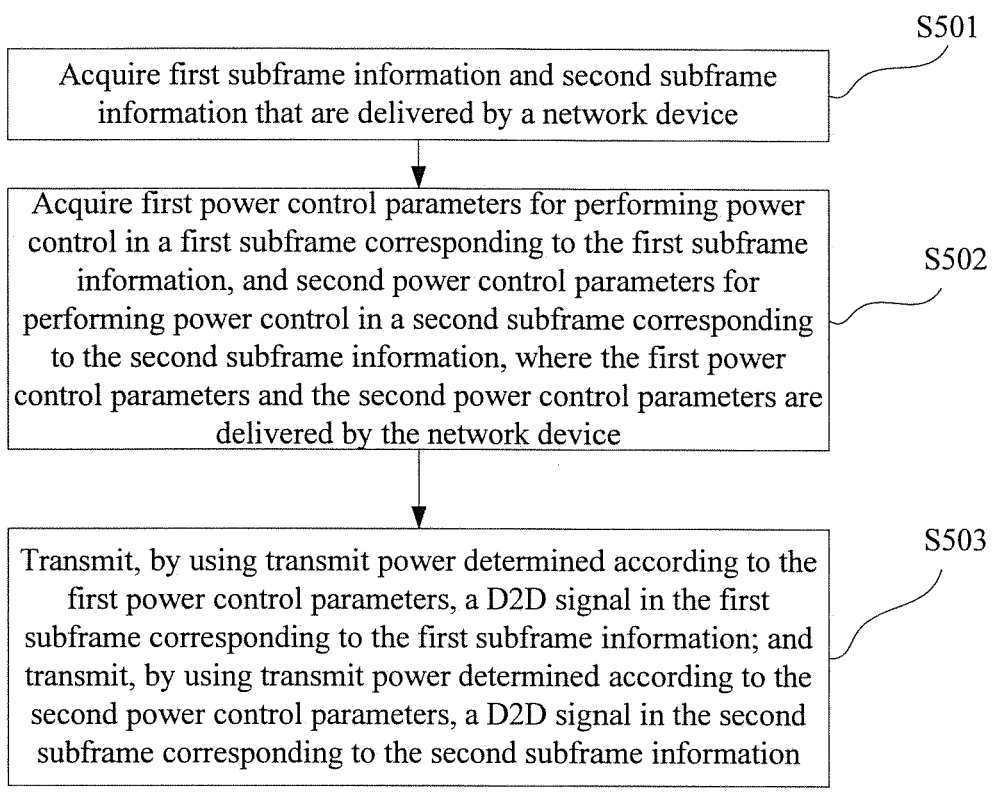
FIG. 4B is a first flowchart of implementing a transmit power control method in D2D communication according to Embodiment 2 of the present invention.

FIG. 4B is a preferable embodiment of a method for controlling transmit power of a D2D signal provided in this embodiment of the present invention, where the method is executed by a user equipment in D2D communication. As shown in FIG. 4B, the method includes:

S501: The user equipment in D2D communication acquires first subframe information and second subframe information that are delivered by a network device.

In this embodiment of the present invention, subframes that are determined by the user equipment in D2D communication and used for transmitting a D2D signal include at least two types of subframes. When power control is performed on each type of subframe of the at least two types of subframes, transmit power is determined according to power control parameters. Subframe information that the user equipment in D2D communication needs to acquire includes the first subframe information and the second subframe information. Both in a first subframe corresponding to the first subframe information and in a second subframe corresponding to the second subframe information, a D2D signal is transmitted by using the transmit power determined according to the power control parameters.

S502: The user equipment in D2D communication acquires first power control parameters for performing power control in a first subframe corresponding to the first subframe information, and second power control parameters for performing power control in a second subframe corresponding to the second subframe information, where the first power control parameters and the second power control parameters are delivered by the network device, and values of the first power control parameters are different from values of the second power control parameters.

S503: Transmit, according to the first subframe information and the first power control parameters by using transmit power determined according to the first power control parameters, a D2D signal in the first subframe corresponding to the first subframe information; and transmit, according to the second subframe information and the second power control parameters by using transmit power determined according to the second power control parameters, a D2D signal in the second subframe corresponding to the second subframe information.

In this embodiment of the present invention, in the first subframe corresponding to the first subframe information, a D2D signal is transmitted by using the transmit power determined according to the first power control parameters; and in the second subframe corresponding to the second subframe information, a D2D signal is transmitted by using the transmit power determined according to the second power control parameters, so that the transmit power for transmitting a D2D signal by using the first subframe is different from the transmit power for transmitting a D2D signal by using the second subframe. Therefore, a D2D signal whose transmit power is relatively small can reduce interference from the D2D signal to an uplink signal received by the network device; and a D2D signal whose transmit power is relatively large can ensure coverage of the D2D signal.

Figure 4C:
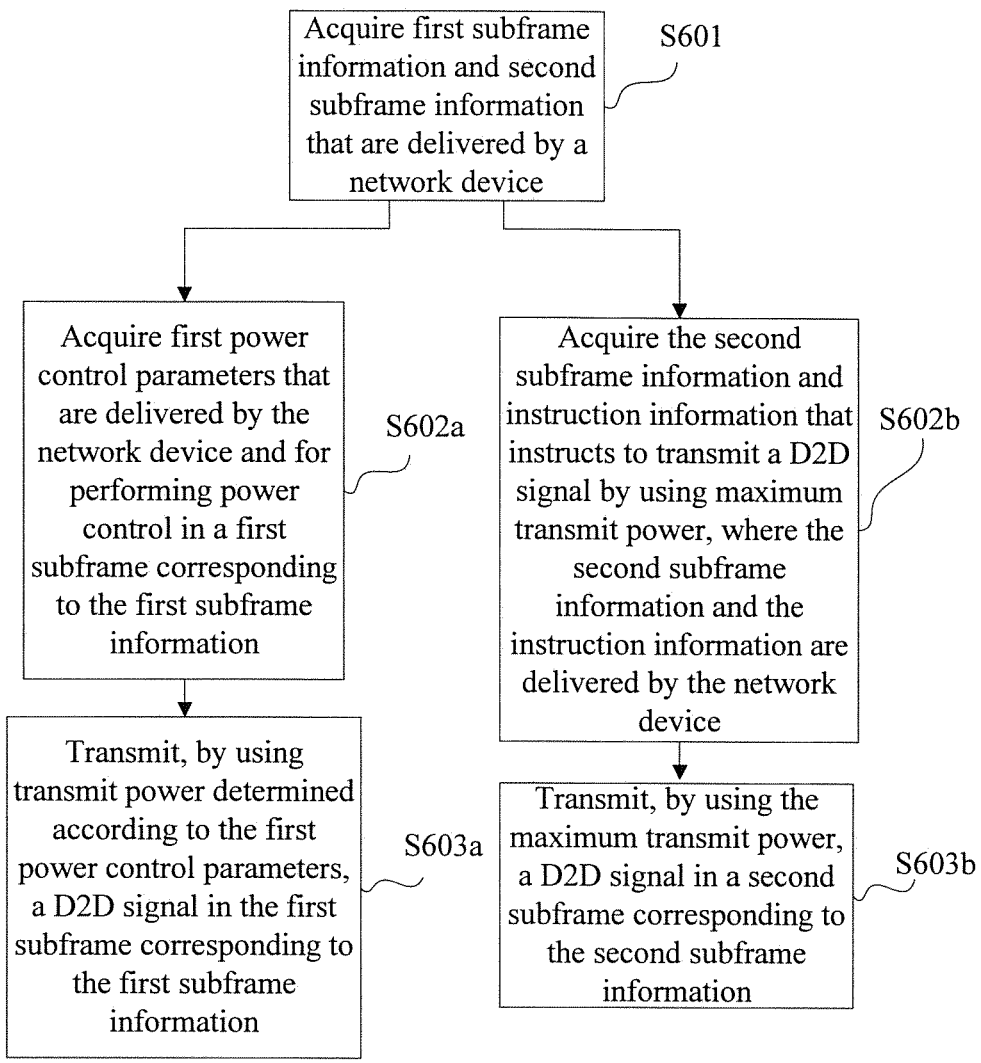
FIG. 4C is a first flowchart of implementing a transmit power control method in D2D communication according to Embodiment 2 of the present invention.

FIG. 4C is another preferable embodiment of a method for controlling transmit power of a D2D signal provided in this embodiment of the present invention, where the method is executed by a user equipment in D2D communication. As shown in FIG. 4C, the method includes:

S601: The user equipment in D2D communication acquires first subframe information and second subframe information that are delivered by a network device.

In this embodiment of the present invention, in a first subframe corresponding to the first subframe information, a D2D signal is transmitted by using transmit power determined according to power control parameters; and in a second subframe corresponding to the second subframe information, a D2D signal is still transmitted by using maximum transmit power supported by the user equipment in D2D communication.

S602a: The user equipment in D2D communication acquires first power control parameters that are delivered by the network device and for performing power control in a first subframe corresponding to the first subframe information.

S602b: The user equipment in D2D communication acquires the second subframe information and instruction information that instructs to transmit a D2D signal in a second subframe corresponding to the second subframe information by using maximum transmit power supported by the user equipment in D2D communication, where the second subframe information and the instruction information are delivered by the network device.

It should be noted that step S602a and step S602b in this embodiment of the present invention are not performed in an order of sequence.

S603a: Transmit, according to the first subframe information and the first power control parameters by using transmit power determined according to the first power control parameters, a D2D signal in the first subframe corresponding to the first subframe information.

S603b: Transmit, according to the second subframe information and the instruction information by using the maximum transmit power supported by the user equipment in D2D communication, a D2D signal in the second subframe corresponding to the second subframe information.

In this embodiment of the present invention, the transmit power for transmitting a D2D signal by using the first subframe is determined according to the first power control parameters; and a D2D signal transmitted by using the second subframe is still transmitted at the maximum transmit power, so that the transmit power for transmitting a D2D signal by using the first subframe is different from the transmit power for transmitting a D2D signal by using the second subframe. The transmit power for transmitting a D2D signal by using the first subframe is relatively small, so that interference from the D2D signal to an uplink signal received by the network device can be reduced, thereby improving reliability of receiving the uplink signal by the network device. The transmit power for transmitting a D2D signal by using the second subframe is maximum power, and the transmit power of a D2D signal is relatively large, which can ensure coverage of the D2D signal.

It should be noted that, a process in which a user equipment in D2D communication controls transmit power of a D2D signal and that is involved in Embodiment 1 of the present invention is applicable to implementing control on transmit power of a D2D signal provided in Embodiment 2 of the present invention. Therefore, for a part not described in detail in Embodiment 2 of the present invention, refer to descriptions of Embodiment 1 and related accompanying drawings.

In this embodiment of the present invention, a user equipment in D2D communication may not necessarily use maximum transmit power supported by the user equipment in D2D communication to transmit a D2D signal on all subframes. Transmit power that the user equipment in D2D communication uses when transmitting a D2D signal may adapt to subframe information and power control parameters that are determined and delivered by a network device. On some or all subframes, a D2D signal is transmitted by using transmit power determined according to the power control parameters, so as to restrict interference from the D2D signal to an uplink signal received by the network device, thereby improving reliability of receiving the uplink signal by the network device.

Embodiment 3

Figure 5:
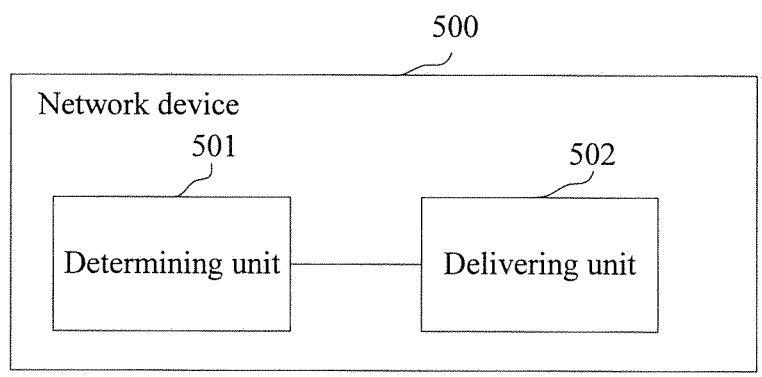
FIG. 5 is a schematic structural diagram of a network device according to Embodiment 3 of the present invention.

Based on the transmit power control method in D2D communication provided in the foregoing Embodiment 1, this embodiment of the present invention provides a network device 500. As shown in FIG. 5, the network device includes a determining unit 501 and a delivering unit 502, where:

the determining unit 501 is configured to determine control information, where the control information includes first subframe information and a first power control manner in which power control is performed in a first subframe corresponding to the first subframe information, and second subframe information and a second power control manner in which power control is performed in a second subframe corresponding to the second subframe information; and the delivering unit 502 is configured to deliver the control information determined by the determining unit 501, so that a user equipment in D2D communication transmits, by using transmit power determined according to the first power control manner, a D2D signal in the first subframe corresponding to the first subframe information, and transmits, by using transmit power determined according to the second power control manner, a D2D signal in the second subframe corresponding to the second subframe information.

With reference to the network device provided above, in a first implementation manner, the determining unit 501 is specifically configured to determine the control information for the user equipment in D2D communication to perform power control, in the following manner:

determining the first subframe information and first power control parameters for performing power control in the first subframe corresponding to the first subframe information, and the second subframe information and second power control parameters for performing power control in the second subframe corresponding to the second subframe information, where values of the first power control parameters are different from values of the second power control parameters.

The delivering unit 502 is specifically configured to deliver the control information in the following manner, so that the user equipment in D2D communication transmits, by using the transmit power determined according to the first power control manner, a D2D signal in the first subframe corresponding to the first subframe information, and transmits, by using the transmit power determined according to the second power control manner, a D2D signal in the second subframe corresponding to the second subframe information:

delivering the first subframe information, the first power control parameters, the second subframe information, and the second power control parameters, so that the user equipment in D2D communication transmits, by using the transmit power determined according to the first power control parameters, a D2D signal in the first subframe corresponding to the first subframe information, and transmits, by using the transmit power determined according to the second power control parameters, a D2D signal in the second subframe corresponding to the second subframe information.

With reference to the network device provided above, in a second implementation manner, the determining unit 501 is specifically configured to determine the control information in the following manner: determining the first subframe information and first power control parameters for performing power control in the first subframe corresponding to the first subframe information, and the second subframe information and instruction information that instructs to transmit a D2D signal in the second subframe by using maximum transmit power supported by the user equipment in D2D communication.

The delivering unit 502 is specifically configured to deliver the control information in the following manner, so that the user equipment in D2D communication transmits, by using the transmit power determined according to the first power control manner, a D2D signal in the first subframe corresponding to the first subframe information, and transmits, by using the transmit power determined according to the second power control manner, a D2D signal in the second subframe corresponding to the second subframe information:

delivering the first subframe information, the first power control parameters, the second subframe information, and the instruction information, so that the user equipment in D2D communication transmits, by using the transmit power determined according to the first power control parameters, a D2D signal in the first subframe corresponding to the first subframe information, and transmits, by using the maximum transmit power supported by the user equipment in D2D communication, a D2D signal in the second subframe corresponding to the second subframe information.

With reference to the foregoing first implementation manner or the second implementation manner, in a third implementation manner, the power control parameters determined by the determining unit 501 include:

a path loss compensation factor and target receive power at which the network device receives an uplink signal; or a path loss compensation factor, a power offset, and target receive power at which the network device receives an uplink signal.

The network device provided in this embodiment of the present invention may be used to execute the transmit power control method in D2D communication involved in Embodiment 1 and accompanying drawings thereof. Therefore, for related descriptions of the network device provided in this embodiment of the present invention that are not given in detail, refer to related descriptions of Embodiment 1 and the accompanying drawings thereof. Details are not described herein again.

The network device provided in Embodiment 3 of the present invention determines and delivers control information for a user equipment in D2D communication to perform power control, where the control information includes first subframe information and a first power control manner in which power control is performed in a first subframe corresponding to the first subframe information, and second subframe information and a second power control manner in which power control is performed in a second subframe corresponding to the second subframe information. After receiving the control information determined and delivered by the network device, the user equipment in D2D communication can separately determine, by using different power control manners, transmit power for transmitting a D2D signal in the first subframe and the second subframe, so as to implement dynamic adjustment control on the transmit power used for transmitting a D2D signal in D2D communication. That is, compared with that a user equipment in D2D communication transmits a D2D signal only at maximum transmit power in the prior art, the user equipment in D2D communication in this embodiment of the present invention can flexibly control, according to an actual condition, the transmit power that a D2D communication device uses when transmitting a D2D signal, so that interference from the D2D signal to an uplink signal received by the network device can be restricted, thereby improving accuracy of receiving the uplink signal by the network device.

Embodiment 4

Figure 6:
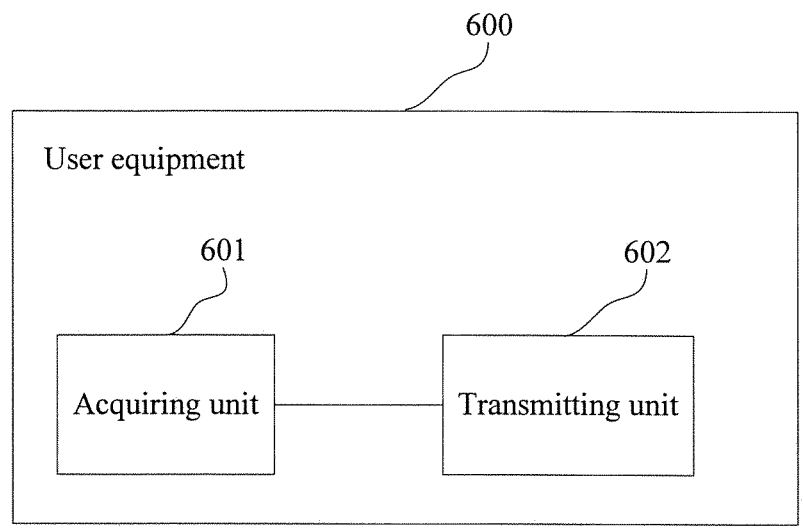
FIG. 6 is a schematic structural diagram of a user equipment according to Embodiment 4 of the present invention.

Based on the transmit power control method in D2D communication provided in Embodiment 2 of the present invention, this embodiment of the present invention provides a user equipment 600. As shown in FIG. 6, the user equipment includes an acquiring unit 601 and a transmitting unit 602, where:

the acquiring unit 601 is configured to acquire control information delivered by a network device, where the control information includes first subframe information and a first power control manner in which power control is performed in a first subframe corresponding to the first subframe information, and second subframe information and a second power control manner in which power control is performed in a second subframe corresponding to the second subframe information; and the transmitting unit 602 is configured to: according to the control information acquired by the acquiring unit 601, transmit, by using transmit power determined according to the first power control manner, a D2D signal in the first subframe corresponding to the first subframe information, and transmit, by using transmit power determined according to the second power control manner, a D2D signal in the second subframe corresponding to the second subframe information.

With reference to the user equipment provided above, in a first implementation manner, the acquiring unit 601 is specifically configured to acquire the control information delivered by the network device, in the following manner:

acquiring the first subframe information and first power control parameters for performing power control in the first subframe corresponding to the first subframe information, and the second subframe information and second power control parameters for performing power control in the second subframe corresponding to the second subframe information, where the first subframe information and the first power control parameters are delivered by the network device, and values of the first power control parameters are different from values of the second power control parameters.

The transmitting unit 602 is specifically configured to: transmit, according to the control information by using the transmit power determined according to the first power control manner, a D2D signal in the first subframe corresponding to the first subframe information, and transmit, according to the control information by using the transmit power determined according to the second power control manner, a D2D signal in the second subframe corresponding to the second subframe information, in the following manner:

transmitting, according to the first subframe information and the first power control parameters by using the transmit power determined according to the first power control parameters, a D2D signal in the first subframe corresponding to the first subframe information; and transmitting, according to the second subframe information and the second power control parameters by using the transmit power determined according to the second power control parameters, a D2D signal in the second subframe corresponding to the second subframe information.

With reference to the user equipment provided above, in a second implementation manner, the acquiring unit 601 is specifically configured to acquire the control information delivered by the network device, in the following manner:

acquiring the first subframe information and first power control parameters for performing power control in the first subframe corresponding to the first subframe information, and the second subframe information and instruction information that instructs to transmit a D2D signal in the second subframe corresponding to the second subframe information by using maximum transmit power supported by a user equipment in D2D communication, where the first subframe information and the first power control parameters are delivered by the network device.

The transmitting unit 602 is specifically configured to: transmit, according to the control information by using the transmit power determined according to the first power control manner, a D2D signal in the first subframe corresponding to the first subframe information, and transmit, according to the control information by using the transmit power determined according to the second power control manner, a D2D signal in the second subframe corresponding to the second subframe information, in the following manner:

transmitting, according to the first subframe information and the first power control parameters by using the transmit power determined according to the first power control parameters, a D2D signal in the first subframe corresponding to the first subframe information; and transmitting, according to the second subframe information and the instruction information by using the maximum transmit power supported by the user equipment in D2D communication, a D2D signal in the second subframe corresponding to the second subframe information.

With reference to the first implementation manner or the second implementation manner, in a third implementation manner, the transmit power used by the transmitting unit 602 to transmit a D2D signal is specifically determined in the following manner:

determining, according to a path loss estimate, target receive power that is delivered by the network device and at which the network device receives an uplink signal, and a path loss compensation factor delivered by the network device, the transmit power for transmitting a D2D signal; or determining, according to a path loss estimate, target receive power that is delivered by the network device and at which the network device receives an uplink signal, a path loss compensation factor delivered by the network device, and a power offset delivered by the network device, the transmit power for transmitting a D2D signal.

The user equipment provided in this embodiment of the present invention may be used to execute the transmit power control method in D2D communication involved in Embodiment 2 and accompanying drawings thereof. Therefore, for related descriptions of the user equipment provided in this embodiment of the present invention that are not given in detail, refer to related descriptions of Embodiment 2 and the accompanying drawings thereof. Details are not described herein again.

The user equipment provided in this embodiment of the present invention acquires control information that is delivered by a network device and for a user equipment in D2D communication to perform power control, where the control information includes first subframe information and a first power control manner in which power control is performed in a first subframe corresponding to the first subframe information, and second subframe information and a second power control manner in which power control is performed in a second subframe corresponding to the second subframe information. The user equipment in D2D communication can separately determine, by using different power control manners, transmit power for transmitting a D2D signal in the first subframe and the second subframe, so as to implement dynamic adjustment control on the transmit power used for transmitting a D2D signal in D2D communication. That is, compared with that a user equipment in D2D communication transmits a D2D signal only at maximum transmit power in the prior art, the user equipment in D2D communication in this embodiment of the present invention can flexibly control, according to an actual condition, the transmit power that a D2D communication device uses when transmitting a D2D signal, so that interference from the D2D signal to an uplink signal received by the network device can be restricted, thereby improving accuracy of receiving the uplink signal by the network device.

Embodiment 5

Figure 7:
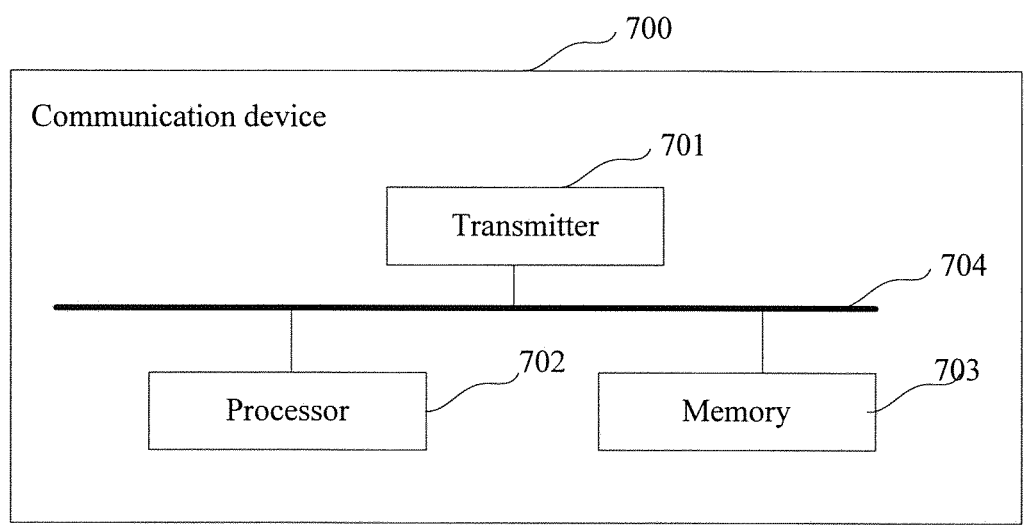
FIG. 7 is a schematic structural diagram of a communication device according to Embodiment 5 of the present invention.

Based on the transmit power control method in D2D communication provided in Embodiment 1 and the network device provided in Embodiment 3, Embodiment 5 of the present invention provides a communication device 700. As shown in FIG. 7, the communication device includes a transmitter 701, a processor 702, a memory 703, and a bus 704, where the transmitter 701 and the memory 703 are both connected to the processor 702 through the bus 704.

The memory 703 is configured to store program code executed by the processor 702.

The processor 702 is configured to invoke the program stored in the memory 703 and determine control information for a user equipment in D2D communication to perform power control, where the control information includes first subframe information and a first power control manner in which power control is performed in a first subframe corresponding to the first subframe information, and second subframe information and a second power control manner in which power control is performed in a second subframe corresponding to the second subframe information.

The transmitter 701 is configured to deliver the control information determined by the processor 702, so that the user equipment in D2D communication transmits, by using transmit power determined according to the first power control manner, a D2D signal in the first subframe corresponding to the first subframe information, and transmits, by using transmit power determined according to the second power control manner, a D2D signal in the second subframe corresponding to the second subframe information.

With reference to the communication device provided above, in a first implementation manner, the processor 702 is specifically configured to determine the control information in the following manner: determining the first subframe information and first power control parameters for performing power control in the first subframe corresponding to the first subframe information, and the second subframe information and second power control parameters for performing power control in the second subframe corresponding to the second subframe information, where values of the first power control parameters are different from values of the second power control parameters.

The transmitter 701 is specifically configured to deliver the control information in the following manner, so that the user equipment in D2D communication transmits, by using the transmit power determined according to the first power control manner, a D2D signal in the first subframe corresponding to the first subframe information, and transmits, by using the transmit power determined according to the second power control manner, a D2D signal in the second subframe corresponding to the second subframe information:

delivering the first subframe information, the first power control parameters, the second subframe information, and the second power control parameters, so that the user equipment in D2D communication transmits, by using the transmit power determined according to the first power control parameters, a D2D signal in the first subframe corresponding to the first subframe information, and transmits, by using the transmit power determined according to the second power control parameters, a D2D signal in the second subframe corresponding to the second subframe information.

With reference to the communication device provided above, in a second implementation manner, the processor 702 is specifically configured to determine the control information in the following manner: determining the first subframe information and first power control parameters for performing power control in the first subframe corresponding to the first subframe information, and the second subframe information and instruction information that instructs to transmit a D2D signal in the second subframe by using maximum transmit power supported by the user equipment in D2D communication.

The transmitter 701 is specifically configured to deliver the control information in the following manner, so that the user equipment in D2D communication transmits, by using the transmit power determined according to the first power control manner, a D2D signal in the first subframe corresponding to the first subframe information, and transmits, by using the transmit power determined according to the second power control manner, a D2D signal in the second subframe corresponding to the second subframe information:

delivering the first subframe information, the first power control parameters, the second subframe information, and the instruction information, so that the user equipment in D2D communication transmits, by using the transmit power determined according to the first power control parameters, a D2D signal in the first subframe corresponding to the first subframe information, and transmits, by using the maximum transmit power supported by the user equipment in D2D communication, a D2D signal in the second subframe corresponding to the second subframe information.

With reference to the first implementation manner or the second implementation manner, in a third implementation manner, the power control parameters determined by the processor 702 include:

a path loss compensation factor and target receive power at which a network device receives an uplink signal; or a path loss compensation factor, a power offset, and target receive power at which a network device receives an uplink signal.

The communication device provided in Embodiment 5 of the present invention may be used to execute the transmit power control method in D2D communication involved in Embodiment 1 and accompanying drawings thereof. Therefore, in Embodiment 5 of the present invention, for related descriptions of the communication device shown in FIG. 7 that are not given in detail, refer to related descriptions of Embodiment 1 and the accompanying drawings thereof. Details are not described herein again.

The communication device provided in this embodiment of the present invention determines and delivers control information for a user equipment in D2D communication to perform power control, where the control information includes first subframe information and a first power control manner in which power control is performed in a first subframe corresponding to the first subframe information, and second subframe information and a second power control manner in which power control is performed in a second subframe corresponding to the second subframe information. After receiving the control information determined and delivered by a network device, the user equipment in D2D communication can separately determine, by using different power control manners, transmit power for transmitting a D2D signal in the first subframe and the second subframe, so as to implement dynamic adjustment control on the transmit power used for transmitting a D2D signal in D2D communication. That is, compared with that a user equipment in D2D communication transmits a D2D signal only at maximum transmit power in the prior art, the user equipment in D2D communication in this embodiment of the present invention can flexibly control, according to an actual condition, the transmit power that a D2D communication device uses when transmitting a D2D signal, so that interference from the D2D signal to an uplink signal received by the network device can be restricted, thereby improving accuracy of receiving the uplink signal by the network device.

Embodiment 6

Figure 8:
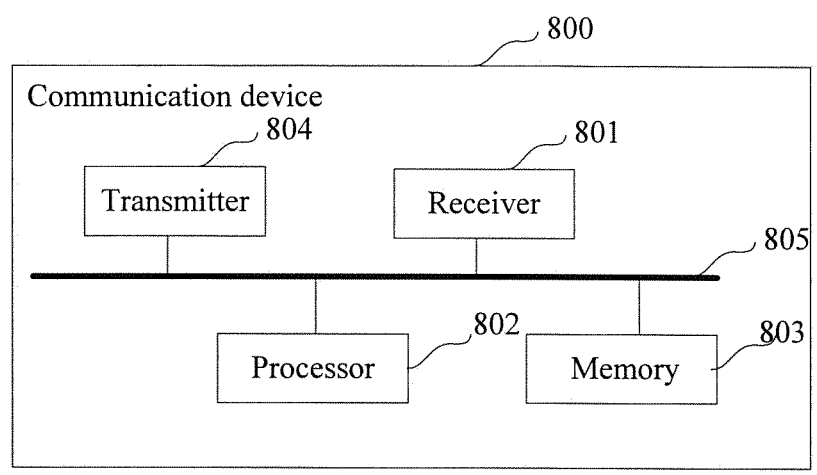
FIG. 8 is a schematic structural diagram of a communication device according to an embodiment of the present invention.

Based on the transmit power control method in D2D communication provided in Embodiment 2 and the user equipment provided in Embodiment 4, Embodiment 6 of the present invention provides a communication device 800. As shown in FIG. 8, the communication device includes a receiver 801, a processor 802, a memory 803, a transmitter 804, and a bus 805, where the transceiver 801, the memory 803, and the transmitter 804 are all connected to the processor 802 through the bus 805.

The memory 803 is configured to store program code executed by the processor 802.

The receiver 801 is configured to acquire control information delivered by a network device, where the control information includes first subframe information and a first power control manner in which power control is performed in a first subframe corresponding to the first subframe information, and second subframe information and a second power control manner in which power control is performed in a second subframe corresponding to the second subframe information.

The processor 802 is configured to: invoke the program stored in the memory 803; and according to the control information acquired by the receiver 801, control the transmitter 804 to transmit, by using transmit power determined according to the first power control manner, a D2D signal in the first subframe corresponding to the first subframe information, and to transmit, by using transmit power determined according to the second power control manner, a D2D signal in the second subframe corresponding to the second subframe information.

With reference to the communication device provided above, in a first implementation manner, the receiver 801 is specifically configured to acquire the control information delivered by the network device, in the following manner:

acquiring the first subframe information and first power control parameters for performing power control in the first subframe corresponding to the first subframe information, and the second subframe information and second power control parameters for performing power control in the second subframe corresponding to the second subframe information, where the first subframe information and the first power control parameters are delivered by the network device, and values of the first power control parameters are different from values of the second power control parameters.

The processor 802 is specifically configured to: according to the control information acquired by the receiver 801, control the transmitter 804 to transmit, by using the transmit power determined according to the first power control manner, a D2D signal in the first subframe corresponding to the first subframe information, and to transmit, by using the transmit power determined according to the second power control manner, a D2D signal in the second subframe corresponding to the second subframe information, in the following manner:

according to the first subframe information and the first power control parameters, controlling the transmitter 804 to transmit, by using the transmit power determined according to the first power control parameters, a D2D signal in the first subframe corresponding to the first subframe information; and according to the second subframe information and the second power control parameters, controlling the transmitter 804 to transmit, by using the transmit power determined according to the second power control parameters, a D2D signal in the second subframe corresponding to the second subframe information.

With reference to the communication device provided above, in a second implementation manner, the receiver 801 is specifically configured to acquire the control information delivered by the network device, in the following manner:

acquiring the first subframe information and first power control parameters for performing power control in the first subframe corresponding to the first subframe information, and the second subframe information and instruction information that instructs to transmit a D2D signal in the second subframe corresponding to the second subframe information by using maximum transmit power supported by a user equipment in D2D communication, where the first subframe information and the first power control parameters are delivered by the network device.

The processor 802 is specifically configured to: according to the control information acquired by the receiver 801, control the transmitter 804 to transmit, by using the transmit power determined according to the first power control manner, a D2D signal in the first subframe corresponding to the first subframe information, and to transmit, by using the transmit power determined according to the second power control manner, a D2D signal in the second subframe corresponding to the second subframe information, in the following manner:

according to the first subframe information and the first power control parameters, controlling the transmitter 804 to transmit, by using the transmit power determined according to the first power control parameters, a D2D signal in the first subframe corresponding to the first subframe information; and according to the second subframe information and the instruction information, controlling the transmitter 804 to transmit, by using the maximum transmit power supported by the user equipment in D2D communication, a D2D signal in the second subframe corresponding to the second subframe information.

With reference to the first implementation manner or the second implementation manner, in a third implementation manner, the transmit power that the processor 802 controls the transmitter 804 to use for transmitting a D2D signal is specifically determined in the following manner:

determining, according to a path loss estimate, target receive power that is delivered by the network device and at which the network device receives an uplink signal, and a path loss compensation factor delivered by the network device, the transmit power for transmitting a D2D signal; or determining, according to a path loss estimate, target receive power that is delivered by the network device and at which the network device receives an uplink signal, a path loss compensation factor delivered by the network device, and a power offset delivered by the network device, the transmit power for transmitting a D2D signal.

The communication device provided in Embodiment 6 of the present invention may be used to execute the transmit power control method in D2D communication involved in Embodiment 2 and accompanying drawings thereof. Therefore, in Embodiment 6 of the present invention, for related descriptions of the communication device shown in FIG. 8 that are not given in detail, refer to related descriptions of Embodiment 2 and the accompanying drawings thereof. Details are not described herein again.

The communication device provided in this embodiment of the present invention acquires control information that is delivered by a network device and for a user equipment in D2D communication to perform power control, where the control information includes first subframe information and a first power control manner in which power control is performed in a first subframe corresponding to the first subframe information, and second subframe information and a second power control manner in which power control is performed in a second subframe corresponding to the second subframe information. The user equipment in D2D communication can separately determine, by using different power control manners, transmit power for transmitting a D2D signal in the first subframe and the second subframe, so as to implement dynamic adjustment control on the transmit power used for transmitting a D2D signal in D2D communication. That is, compared with that a user equipment in D2D communication transmits a D2D signal only at maximum transmit power in the prior art, the user equipment in D2D communication in this embodiment of the present invention can flexibly control, according to an actual condition, the transmit power that a D2D communication device uses when transmitting a D2D signal, so that interference from the D2D signal to an uplink signal received by the network device can be restricted, thereby improving accuracy of receiving the uplink signal by the network device.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

The invention claimed is:

1. A transmit power control method in device to device (D2D) communication, the method comprising:
   determining control information, wherein the control information comprises:
      first subframe information and first power control parameters for performing power control in a first subframe corresponding to the first subframe information, and second subframe information and second power control parameters for performing power control in a second subframe corresponding to the second subframe information; and delivering the control information to a user equipment for enabling the user equipment in D2D communication to transmit, by using transmit power determined according to the first power control parameters, a D2D signal in the first subframe corresponding to the first subframe information, and transmit, by using transmit power determined according to the second power control parameters, a D2D signal in the second subframe corresponding to the second subframe information;

wherein the first power control parameters comprise a first path loss compensation factor and first target receive power that is delivered by a network device and at which the network device receives an uplink signal;

wherein the second power control parameters comprise a second path loss compensation factor and a second target receive power that is delivered by the network device and at which the network device receives an uplink signal; and wherein the first target receive power comprised in the first power control parameters is different from the second target receive power comprised in the second power control parameters.

2. The method according to claim 1, wherein:

delivering the control information to the user equipment for enabling the user equipment in D2D communication to transmit, by using transmit power determined according to the first power control parameters, the D2D signal in the first subframe corresponding to the first subframe information, and transmit, by using transmit power determined according to the second power control parameters, the D2D signal in the second subframe corresponding to the second subframe information comprises:

delivering the first subframe information, the first power control parameters, the second subframe information, and the second power control parameters to the user equipment, the subframe information and power control parameters for enabling the user equipment in D2D communication to transmit, by using the transmit power determined according to the first power control parameters, the D2D signal in the first subframe corresponding to the first subframe information, and transmit, by using the transmit power determined according to the second power control parameters, the D2D signal in the second subframe corresponding to the second subframe information.

3. The method according to claim 2, wherein the first power control parameters further comprise a first power offset and the second power control parameters further comprise a second power offset.

4. The method according to claim 1, wherein:

the second power control parameters comprise instruction information for instructing the user equipment to transmit the D2D signal in the second subframe by using maximum transmit power supported by the user equipment in D2D communication; and delivering the control information, to the user equipment for enabling the user equipment in D2D communication to transmit, by using transmit power determined according to the first power control parameters, the D2D signal in the first subframe corresponding to the first subframe information, and transmit, by using transmit power determined according to the second power control parameters, the D2D signal in the second subframe corresponding to the second subframe information comprises:

delivering the first subframe information, the first power control parameters, the second subframe information, and the instruction information, the information and power control parameters for enabling the user equipment in D2D communication to transmit, by using the transmit power determined according to the first power control parameters, the D2D signal in the first subframe corresponding to the first subframe information, and transmit, by using the maximum transmit power supported by the user equipment in D2D communication, the D2D signal in the second subframe corresponding to the second subframe information.

5. A transmit power control method in device to device (D2D) communication, the method comprising:

acquiring control information delivered by a network device, wherein the control information comprises:

first subframe information and first power control parameters for performing power control in a first subframe corresponding to the first subframe information, and second subframe information and second power control parameters for performing power control in a second subframe corresponding to the second subframe information; and transmitting, according to the control information by using transmit power determined according to the first power control parameters, a D2D signal in the first subframe corresponding to the first subframe information, and transmitting, according to the control information by using transmit power determined according to the second power control parameters, a D2D signal in the second subframe corresponding to the second subframe information;

wherein the first power control parameters comprise a first path loss compensation factor and a first target receive power that is delivered by the network device and at which a network device receives an uplink signal;

wherein the second power control parameters comprise a second path loss compensation factor and a second target receive power that is delivered by the network device and at which the network device receives an uplink signal; and wherein the first target receive power comprised in the first power control parameters is different from the second target receive power comprised in the second power control parameters.

6. The method according to claim 5, wherein:

transmitting, according to the control information by using transmit power determined according to the first power control parameters, the D2D signal in the first subframe corresponding to the first subframe information, and transmitting, according to the control information by using transmit power determined according to the second power control parameters, the D2D signal in the second subframe corresponding to the second subframe information comprises:

transmitting, according to the first subframe information and the first power control parameters by using the transmit power determined according to the first power control parameters, the D2D signal in the first subframe corresponding to the first subframe information, and transmitting, according to the second subframe information and the second power control parameters by using the transmit power determined according to the second power control parameters, the D2D signal in the second subframe corresponding to the second subframe information.

7. The method according to claim 6, wherein the first power control parameters further comprise a first power offset and the second power control parameters further comprise a second power offset.

8. The method according to claim 5, wherein:
the second power control parameters comprise instruction information for transmitting the D2D signal in the second subframe corresponding to the second subframe information by using maximum transmit power supported by a user equipment in D2D communication, where the first subframe information and the first power control parameters are delivered by the network device; and
transmitting, according to the control information by using transmit power determined according to the first power control parameters, the D2D signal in the first subframe corresponding to the first subframe information, and transmitting, according to the control information by using transmit power determined according to the second power control parameters, the D2D signal in the second subframe corresponding to the second subframe information comprises:
transmitting, according to the first subframe information and the first power control parameters by using the transmit power determined according to the first power control parameters, the D2D signal in the first subframe corresponding to the first subframe information, and
transmitting, according to the second subframe information and the instruction information by using the maximum transmit power supported by the user equipment in D2D communication, the D2D signal in the second subframe corresponding to the second subframe information.

9. A network device, comprising:
at least one processor configured to determine control information, wherein the control information comprises:
first subframe information and first power control parameters for performing power control in a first subframe corresponding to the first subframe information, and
second subframe information and second power control parameters for performing power control in a second subframe corresponding to the second subframe information; and
a transmitter configured to deliver the control information to user equipment for enabling the user equipment in device to device (D2D) communication to transmit, by using transmit power determined according to the first power control parameters, a D2D signal in the first subframe corresponding to the first subframe information, and transmit, by using transmit power determined according to the second power control parameters, a D2D signal in the second subframe corresponding to the second subframe information,
wherein the first power control parameters comprise a first path loss compensation factor and a first target receive power that is delivered by the network device and at which a network device receives an uplink signal;
wherein the second power control parameters comprise a second path loss compensation factor and a second target receive power that is delivered by the network device and at which the network device receives an uplink signal; and
wherein the first target receive power comprised in the first power control parameters is different from the second target receive power comprised in the second power control parameters.

10. The network device according to claim 9, wherein:
the transmitter is configured to deliver the control information in the following manner:
deliver the first subframe information, the first power control parameters, the second subframe information, and the second power control parameters, the subframe information and power control parameters for enabling the user equipment in D2D communication to transmit, by using the transmit power determined according to the first power control parameters, the D2D signal in the first subframe corresponding to the first subframe information, and transmit, by using the transmit power determined according to the second power control parameters, the D2D signal in the second subframe corresponding to the second subframe information.

11. The network device according to claim 10, wherein the first power control parameters further comprise a first power offset and the second power control parameters further comprise a second power offset.

12. The network device according to claim 9, wherein:
the second power control parameters comprise instruction information for instructing the user equipment to transmit the D2D signal in the second subframe by using maximum transmit power supported by the user equipment in D2D communication; and
the transmitter is configured to deliver the control information in the following manner:
deliver the first subframe information, the first power control parameters, the second subframe information, and the instruction information, the information and power control parameters for enabling the user equipment in D2D communication to transmit, by using the transmit power determined according to the first power control parameters, the D2D signal in the first subframe corresponding to the first subframe information, and transmit, by using the maximum transmit power supported by the user equipment in D2D communication, the D2D signal in the second subframe corresponding to the second subframe information.

13. A user equipment, comprising:
a receiver configured to acquire control information delivered by a network device, wherein the control information comprises:
first subframe information and first power control parameters for performing power control in a first subframe corresponding to the first subframe information, and
second subframe information and second power control parameters for performing power control in a second subframe corresponding to the second subframe information; and
a transmitter configured to: according to the control information acquired by the receiver, transmit, by using transmit power determined according to the first power control parameters, a device to device (D2D) signal in the first subframe corresponding to the first subframe information, and transmit, by using transmit power determined according to the second power control parameters, a D2D signal in the second subframe corresponding to the second subframe information;

wherein the first power control parameters comprise a first path loss compensation factor and a first target receive power that is delivered by the network device and at which a network device receives an uplink signal;

wherein the second power control parameters comprise a second path loss compensation factor and a second target receive power that is delivered by the network device and at which the network device receives an uplink signal; and wherein the first target receive power comprised in the first power control parameters is different from the second target receive power comprised in the second power control parameters.

14. The user equipment according to claim 13, wherein:
the transmitter is further configured to:
transmit, according to the first subframe information and the first power control parameters by using the transmit power determined according to the first power control parameters, the D2D signal in the first subframe corresponding to the first subframe information, and
transmit, according to the second subframe information and the second power control parameters by using the transmit power determined according to the second power control parameters, the D2D signal in the second subframe corresponding to the second subframe information.

15. The user equipment according to claim 14, wherein the first power control parameters further comprise a first power offset and the second power control parameters further comprise a second power offset.

16. The user equipment according to claim 13, wherein:
the second power control parameters comprise instruction information for transmitting the D2D signal in the second subframe corresponding to the second subframe information by using maximum transmit power supported by the user equipment in D2D communication, where the first subframe information and the first power control parameters are delivered by the network device; and
the transmitter is further configured to:
transmit, according to the first subframe information and the first power control parameters by using the transmit power determined according to the first power control parameters, the D2D signal in the first subframe corresponding to the first subframe information, and
transmit, according to the second subframe information and the instruction information by using the maximum transmit power supported by the user equipment in D2D communication, the D2D signal in the second subframe corresponding to the second subframe information.

* * * * *